United States Patent
Conner et al.

(10) Patent No.: US 10,319,213 B1
(45) Date of Patent: Jun. 11, 2019

(54) THERMAL MANAGEMENT IN SMART DOORBELLS

(71) Applicant: Google LLC, Mountain View, CA (US)

(72) Inventors: Brian Conner, Davenport, CA (US); Kelly Veit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/020,307

(22) Filed: Jun. 27, 2018

(51) Int. Cl.
*G08B 25/14* (2006.01)
*G08B 25/08* (2006.01)
*G08B 25/10* (2006.01)
*H04N 7/18* (2006.01)
*H04N 5/33* (2006.01)
*G08B 25/00* (2006.01)
*G08B 29/02* (2006.01)
*G01K 7/22* (2006.01)

(52) U.S. Cl.
CPC .......... *G08B 25/004* (2013.01); *G08B 29/02* (2013.01); *G01K 7/22* (2013.01); *G08B 25/10* (2013.01)

(58) Field of Classification Search
CPC .................................................. G08B 25/004
See application file for complete search history.

(56) References Cited

U.S. PATENT DOCUMENTS

| | | |
|---|---|---|
| 4,967,046 A | 10/1990 | Priesemuth |
| D339,543 S | 9/1993 | Martin |
| D483,281 S | 12/2003 | Cobigo |
| D510,584 S | 10/2005 | Tierney |
| D548,749 S | 8/2007 | Schmidt et al. |
| D690,757 S | 10/2013 | Bart et al. |
| D764,958 S | 8/2016 | Scalisi |
| D765,530 S | 9/2016 | Scalisi |
| D789,363 S | 6/2017 | Jentz et al. |
| D789,364 S | 6/2017 | Jentz et al. |
| D789,365 S | 6/2017 | Jentz et al. |
| D789,366 S | 6/2017 | Jentz et al. |
| D789,367 S | 6/2017 | Jentz et al. |
| D793,268 S | 8/2017 | Ye |
| D795,109 S | 8/2017 | Olodort et al. |
| D800,201 S | 10/2017 | Song |
| D805,570 S | 12/2017 | Shi |
| D806,154 S | 12/2017 | Shi |
| 2012/0056746 A1* | 3/2012 | Kaigler ................ A61B 5/0022 340/573.1 |
| 2015/0341603 A1* | 11/2015 | Kasmir .................... H04N 5/33 348/143 |
| 2016/0191864 A1* | 6/2016 | Siminoff ................ H04N 7/186 348/155 |
| 2018/0013934 A1 | 1/2018 | Germe et al. |
| 2018/0322743 A1* | 11/2018 | Chen ........................ G08B 3/10 |

* cited by examiner

*Primary Examiner* — Joseph H Feild
*Assistant Examiner* — Pameshanand Mahase
(74) *Attorney, Agent, or Firm* — Kilpatrick Townsend & Stockton LLP

(57) ABSTRACT

Various smart doorbell arrangements are presented. Based on a measured temperature of the smart doorbell, operation of the smart doorbell device may be altered such that more heat or less heat is generated without affecting user-facing features. Based on another measured temperature, operation of the smart doorbell may be altered such that a chime that is electrically coupled to the smart doorbell device is not sounded in response to a doorbell actuation, but that a notification of the doorbell actuation is wirelessly transmitted by the smart doorbell device.

20 Claims, 11 Drawing Sheets

THERMAL MANAGEMENT IN SMART DOORBELLS

CROSS-REFERENCES TO RELATED APPLICATIONS

This Application is related to U.S. patent application Ser. No. 15/710,783, filed Sep. 20, 2017, entitled "Doorbell Camera," which is hereby incorporated by reference for all purposes.

BACKGROUND

A battery tends to function effectively within a defined temperature operating range. Below the temperature operating range, the battery may not maintain a defined voltage level while being able to supply at least a certain amount of current. Above the temperature operating range, the high temperature may damage or cause significant degradation in the long-term life of the battery, especially if the battery is outputting a significant amount of current while experiencing the high temperature. Therefore, operating the battery within the defined temperature operating range may help maintain proper performance of the device being powered by the battery and prolong the life (i.e., the amount of time that the battery can supply a defined voltage and output at least a current at the defined voltage) of the battery.

Keeping an operating temperature of a battery within a defined temperature operating range may be relatively easy when the battery is installed in a device that is located indoors. By virtue of the indoor temperature being regulated for the comfort of occupants, the battery is likely to be maintained within its defined temperature operating range. However, if the battery is located in an outdoor environment, the ambient temperature can be significantly variable. For example, freezing winter temperatures and high summer temperatures may result in the ambient environment of a battery located outdoors ranging greatly in temperature. Further, other conditions may also affect the temperature of the battery, such as sunlight being directly incident on the battery or a device in which the battery is housed.

Smart doorbells are often powered by a battery and are sometimes powered by a battery in parallel with other devices. If the battery is not supplying sufficient power then the operation of the devices, including the smart doorbell, will be inhibited

SUMMARY

It is an object of at least some embodiments detailed herein to provide methods and apparatuses for ensuring that a smart doorbell device remains operational even in variable, or extreme, ambient temperatures. Embodiments detailed herein further relate to methods and apparatuses in which the device can remain at least partially operational even if the ambient environment exhibits a sub-optimal temperature. In particular the invention provides a method and apparatus for ensuring that critical and/or important features are maintained in adverse climates. The present invention provides a method and apparatus in which important and/or critical functions of the doorbell are maintained even if the battery is operating in sub-optimal conditions.

Various embodiments are described related to a method for operating a smart doorbell device. In some embodiments, a method for operating a smart doorbell device is described. The method may include measuring, using a temperature sensor of the smart doorbell device, a first measured temperature. The method may include determining, by the smart doorbell device, that the first measured temperature has crossed a first predefined temperature threshold. The method may include, in response to determining that the first measured temperature has crossed the first predefined temperature threshold, altering operation of a component of the smart doorbell device such that user-facing functionality of the smart doorbell device may be unchanged. Altering the operation of the component of the smart doorbell device may cause the component to generate more heat or less heat. The method may include measuring, using the temperature sensor of the smart doorbell device, a second measured temperature. The method may include determining, by the smart doorbell device, that the second measured temperature has crossed a second predefined temperature threshold. The method may include, in response to determining that the second measured temperature has crossed the second predefined temperature threshold, altering operation of the smart doorbell device such that a chime that may be electrically coupled to the smart doorbell device may not be sounded in response to actuation of a doorbell, but that a notification of the actuation of the doorbell may be wirelessly transmitted by the smart doorbell device.

Embodiments of such a method may include one or more of the following features: Altering operation of the component of the smart doorbell device such that user-facing functionality of the smart doorbell device may be unchanged may include increasing a power level of a wireless transceiver that may be located on-board the smart doorbell device. Altering operation of the component of the smart doorbell device such that user-facing functionality of the smart doorbell device may be unchanged may include activating one or more infrared light emitting diodes (IR LEDs) that illuminate a field-of-view of a camera of the smart doorbell device. Altering operation of the component of the smart doorbell device such that user-facing functionality of the smart doorbell device may be unchanged may include activating a speaker of the smart doorbell device at a frequency outside of a human hearing range to generate heat. The method may further include measuring a voltage of one or more batteries of the smart doorbell device. The method may include determining, by the smart doorbell device, the second predefined temperature threshold based at least in part on the measured voltage. The method may further include transmitting, by the smart doorbell device via a wireless transceiver, a video stream. The notification may be linked to a video clip of the video stream transmitted by the smart doorbell device. The video stream may be continuous and the video stream may not be interrupted by a doorbell of the smart doorbell device being actuated. The method may further include measuring, using the temperature sensor of the smart doorbell device, a third measured temperature. The method may further include determining, by the smart doorbell device, that the third measured temperature has crossed a third predefined temperature threshold. The third predefined temperature threshold may be between the first predefined temperature threshold and the second predefined temperature threshold. The method may further include, in response to determining that the third measured temperature has crossed the third predefined temperature threshold, altering operation of a second component of the smart doorbell device such that user-facing functionality of the smart doorbell device may be unchanged. Altering the operation of the second component of the smart doorbell device may cause the component to generate more heat or less heat. The method may further include detecting, by the smart doorbell device, that the doorbell of the smart doorbell device has been actuated.

In some embodiments, a smart doorbell device is described. The device may include a housing. The device may include a doorbell interface, attached with the housing, that may be configured to be actuated by a user. The device may include a battery module located within the housing. The device may include one or more temperature sensors located within the housing. The device may include a wireless interface located within the housing. The device may include chime activation circuitry located within the housing. The device may include one or more processors located within the housing that receives data from the one or more temperature sensors and the doorbell interface, communicates with the wireless interface, and controls the chime activation circuitry. The one or more processors may be configured to receive measured temperatures from the one or more temperature sensors. The one or more processors may be configured to determine that a first measured temperature received from the one or more temperature sensors has crossed a first predefined temperature threshold. The one or more processors may be configured to, in response to determining that the first measured temperature has crossed the first predefined temperature threshold, alter operation of a component of the smart doorbell device such that user-facing functionality of the smart doorbell device may be unchanged. Altering the operation of the component of the smart doorbell device may cause the component to generate more heat or less heat. The one or more processors may be configured to determine that a second measured temperature has crossed a second predefined temperature threshold. The one or more processors may be configured to, in response to determining that the second measured temperature has crossed the second predefined temperature threshold, alter operation of the smart doorbell device such that a chime that may be electrically coupled to the smart doorbell device may not be sounded in response to actuation of the doorbell interface, but that a notification of the actuation of the doorbell interface may be wirelessly transmitted by the wireless interface.

Embodiments of such a device may include one or more of the following features: The one or more processors may be configured to alter operation of the component of the smart doorbell device such that user-facing functionality of the smart doorbell device may be unchanged includes the one or more processors being configured to cause a power level of the wireless interface to be increased. The one or more processors being configured to alter operation of the component of the smart doorbell device such that user-facing functionality of the smart doorbell device may be unchanged may include the one or more processors being configured to activate one or more infrared light emitting diodes (IR LEDS) that illuminate a field-of-view of a camera of the smart doorbell device. The one or more processors being configured to alter operation of the component of the smart doorbell device such that user-facing functionality of the smart doorbell device may be unchanged may include the one or more processors being configured to activate a speaker of the smart doorbell device at a frequency outside of a human hearing range to generate heat. The one or more processors may be further configured to determine the second predefined temperature threshold based at least in part on a measured voltage of the battery module. The device may further include a camera, attached with the housing, that captures video. The wireless interface transmits a video stream captured by the camera. The notification generated by the one or more processors may be linked to a video clip of the video stream transmitted by the wireless interface. The video stream may be continuous and the video stream may not be interrupted by the doorbell interface being actuated. The one or more processors may be further configured to determine that a third measured temperature has crossed a third predefined temperature threshold. The third predefined temperature threshold may be between the first predefined temperature threshold and the second predefined temperature threshold. In response to determining that the third measured temperature has crossed the third predefined temperature threshold, alter operation of a second component of the smart doorbell device such that user-facing functionality of the smart doorbell device may be unchanged. Altering the operation of the second component of the smart doorbell device may cause the component to generate more heat or less heat. Altering the operation of the component may include causing a power level of the wireless interface to be increased and altering the operation of the second component may include activating one or more infrared light emitting diodes (IR LEDs) that illuminate a field-of-view of a camera of the smart doorbell device.

In some embodiments, a video enabled doorbell is described. The device may include a thermometer to measure the temperature of the video enabled doorbell. The device may include a controller. The device may include infra-red light emitting diodes. The device may include a wireless transceiver. The device may include a speaker operable at a frequency outside of human hearing range. The controller may be configured to operate one or more of the infra-red light emitting diodes, the wireless transceiver and/ or a speaker operable at a frequency outside of human hearing range when the temperatures, detected by the thermometer, may be below a pre-determined threshold.

Embodiments of such a device may include one or more of the following features: If the temperature is below a second predetermined threshold, the second predetermined threshold being lower than the first pre-determined threshold, the controller may be configured to increase the power to the infra-red light emitting diodes. The controller may be configured to increase the power to the wireless transceiver. The controller may be configured to increase the power to the speaker operable at a frequency outside of human hearing range. The device may include a camera with a high dynamic range feature and, if the temperature may be above a third pre-determined threshold, the controller may be configured to switch off the high dynamic range feature. If the temperature detected by the thermometer may be above the third pre-determined threshold, the controller may be configured to reduce the power to the infra-red light emitting diodes. If the doorbell may be actuated and the temperature detected by the thermometer may be either above a fourth predetermined threshold, or below a fifth pre-determined threshold, a notification may be sent to the user.

In some embodiments, a method for maintaining functionality of a smart home device when a low ambient temperature is present is described. The method may include measuring, using a temperature sensor of the smart home device, a temperature. The method may include determining, by the smart home device, that the temperature may be below a predefined low temperature threshold. The method may include, in response to determining that the temperature may be below the predefined low temperature threshold, altering operation of the smart home device. Altering operation of the smart home device may include a function being performed that may be selected from the group consisting of: increasing a power level of a wireless transceiver that may be located on-board the smart home device; and activating one or more infrared light emitting diodes (IR LEDs) that illuminate a field-of-view of a camera of the smart home device.

Embodiments of such a method may include one or more of the following features: In response to determining that the temperature may be below a second predefined low temperature threshold, the method may include activating a speaker of the smart home device at a frequency outside of a human hearing range to generate heat. Altering operation of the smart home device may include increasing the power level of the wireless transceiver that may be located on-board the smart home device. The method may include activating the IR LEDs that illuminate the field-of-view of the camera of the smart home device. The method may include determining, by the smart home device, that the temperature may be below a second predefined low temperature threshold that may be lower than the predefined low temperature threshold. Increasing the power level of the wireless transceiver that may be located on-board the smart home device may be performed in response to determining that the temperature may be below the predefined low temperature threshold. Activating the one or more IR LEDs that illuminate the field-of-view of the camera of the smart home device may be performed in response to determining that the temperature may be below the second predefined low temperature threshold. The smart home device may be a smart doorbell device. The method may include determining, by the smart home device, that a doorbell button of the smart home device has been actuated. The method may include determining, by the smart home device, that the temperature may be below a full-operation threshold. The method may include, in response to the doorbell being actuated and the temperature being determined to be below a full-operation threshold, transmitting a wireless message indicative of the doorbell button actuation. The method may include measuring a voltage of one or more batteries of the smart home device. In response to doorbell button being actuated, the measured temperature, and the measured voltage of the one or more batteries of the smart home device, may cause a doorbell chime electrically wired with the smart home device to sound. The method may include measuring a voltage of one or more batteries of the smart home device. In response to the doorbell being actuated, the voltage of the one or more batteries of the smart home device, and the temperature, may determine to not activate a doorbell chime electrically wired with the smart home device. The method may include capturing, by the smart home device, a video stream via a camera. The method may include transmitting, by the smart home device, the video stream in real time via the wireless transceiver. Transmitting may begin prior to the doorbell being actuated and may end after the doorbell has been pushed. Transmitting may not be interrupted by the doorbell being actuated. The video stream may be presented uninterrupted in real time by an output device. Altering operation of the smart home device may include activating the one or more LEDs that illuminate the field-of-view of the camera of the smart home device. The method may include measuring an ambient brightness level. The method may include determining that the ambient brightness level may be above a predefined brightness level threshold. The method may include, in response to determining that the temperature may be below the predefined low temperature threshold and the ambient brightness level being above the predefined brightness level threshold, using an infrared cut-off filter to filter out infrared light for a camera of the smart home device.

When the battery is operating in sub-optimal conditions the chime is not rung so that the function of the smart doorbell, to which it is electrically coupled, can be maintained. The smart doorbell and the chime may be coupled in parallel and this ensures that the smart doorbell continues to record video and/or audio when the doorbell is actuated even in extreme temperatures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
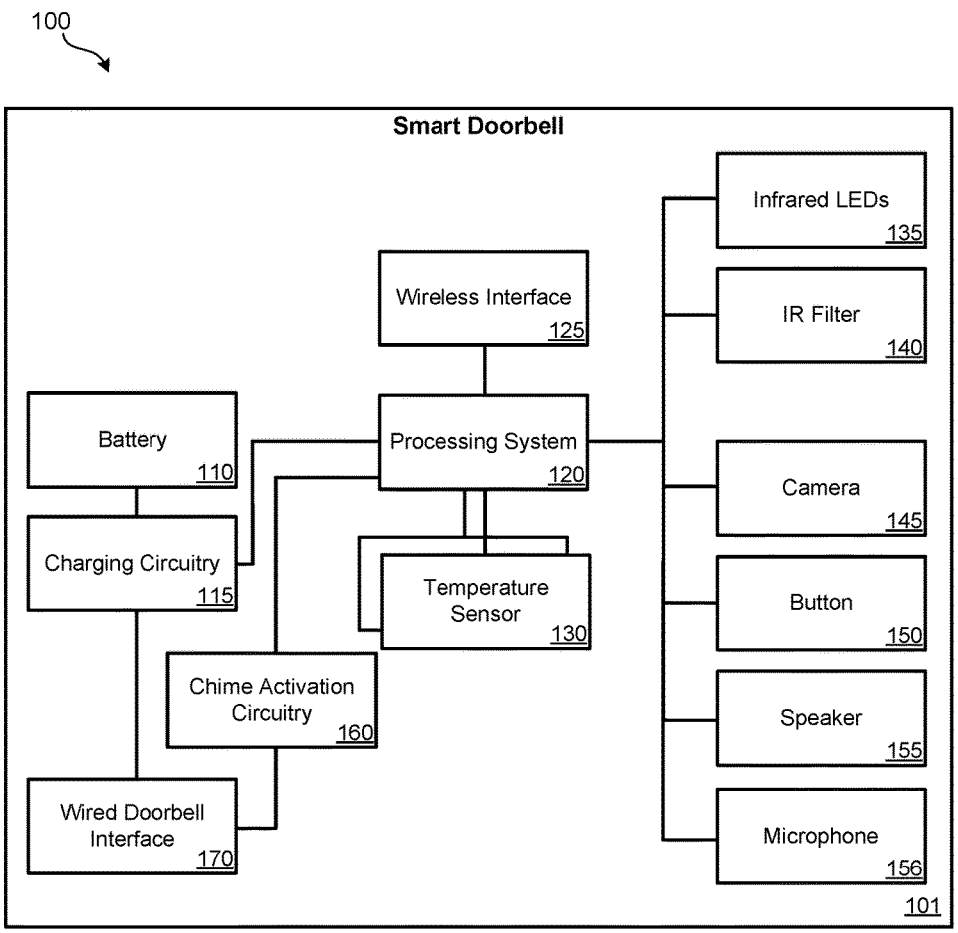
FIG. 1 illustrates a block diagram of an embodiment of a smart doorbell device.

Smart home devices may be installed in or around a structure to provide various smart home services. For example, a smart doorbell device ("smart doorbell" for short) may be installed in place of a conventional doorbell at a structure, such as a home, apartment, condominium, office, building, etc. Such a smart home doorbell may provide "smart" functions in addition to the function of actuating a doorbell chime inside the structure. For instance, a smart home doorbell may have an integrated camera and microphone and may allow one-way or two-way audio and/or video communication between a user and a person who is near the smart doorbell. The user may be inside the structure or elsewhere and may use a mobile device, such as a smartphone, to receive a notification that the person has actuated the doorbell and/or perform one-way or two-way video and/or audio communication with the person near the doorbell.

A smart home device, such as a smart doorbell, may be located outside and may use one or more batteries to power the smart home device at least some of the time. Such a smart home device may be located in a location in which there is no direct control over the ambient environment. For example, a smart doorbell may be located outside and adjacent to a front, side, or back door. In such a location, the smart doorbell is exposed to the outdoor ambient environment and accompanying temperature swings, moisture, and possible direct sunshine.

The smart home device may have integrated functionality that allows the smart home device to increase or decrease its internal temperature to help maintain one or more on-board batteries to be within a defined operating temperature range. In addition or in alternate to having a dedicated heating component (e.g., a heater) and/or a dedicated cooling device (e.g., an exhaust fan), a smart home device may leverage secondary effects of on-board components to increase or decrease the temperature of the smart home device, which could include one or more on-board batteries. For example, a wireless communication interface may be operated at a higher power level that is necessary for data transfer. By operating at the higher power level, an increased amount of heat, which is a byproduct of operating at the higher power level, may be generated, which can heat the one or more on-board batteries. As another example, one or more on-board infrared light emitting diodes (IR LEDs) may be activated even though infrared light is not currently needed for illumination of a field-of-view of the smart home device. A byproduct of the IR LEDs operating may be the generation of heat, which can be used to increase the internal temperature of the smart home device.

Priority functions of the smart doorbell may include its ability to transmit wireless notifications, such as when a person presses a doorbell button, and the ability to stream uninterrupted video and/or audio, such as to a remote server or directly to a user device. Such features may be prioritized over the actuation of an indoor doorbell chime. While the smart doorbell may perform various functions in order to keep one or more batteries of the smart doorbell device within a temperature operating range, if the temperature operating range cannot be achieved, activation of the indoor chime may be forgone. Not activating the indoor chime may help avoid a brownout condition and may help the smart doorbell maintain an uninterrupted video and/or audio stream and to transmit wireless notifications indicative of a doorbell being actuated.

Further detail regarding the increasing and decreasing of temperature of a smart home device and prioritizing the transmission of a video and/or audio stream and wireless notifications are provided in reference to the figures. The following description focuses on a single on-board battery being present in a smart home device; however, it should be understood that such embodiments may also include multiple batteries or a battery pack that includes multiple battery units. In some embodiments, a smart home device may have multiple batteries located in different locations within the smart home device. Embodiments detailed herein may be directed to a smart doorbell device or more generally, a smart home device, such as the smart home devices detailed in relation to FIG. 6. While the description focuses on smart home devices that are typically installed outdoors, the same principles may be used for a smart home device that is installed in an indoor location for which temperature control is desired (e.g., a smart home device installed in a basement or unheated shed, a smart home device installed in a very cold structure, etc.). Further, embodiments detailed herein may be applied to other forms of sensor and/or communication devices besides smart home devices. For instance, an environmental sensor, video camera, or communication device may benefit from having the principles detailed herein incorporated.

FIG. 1 illustrates a block diagram of an embodiment of a smart doorbell device 100 (referred to as "smart doorbell 100" for short). Smart doorbell 100 may include: housing 101; battery 110; charging circuitry 115; processing system 120; wireless interface 125; one or more temperature sensors 130; infrared (IR) LEDs 135; IR filter 140; camera 145; button 150; speaker 155; chime activation circuitry 160; and wired doorbell interface 170. Housing 105 may serve to house each of the components of smart doorbell 100. Further detail is provided below regarding each component. It should be understood that additional components may be present and/or the function of various components may be combined into a single component. For example, chime activation circuitry 160 may be incorporated as part of processing system 120. As another example, in some embodiments, multiple wireless interfaces 125, a presence or occupancy sensor, and/or display screen may be present.

Battery 110 may be a permanently installed or removable battery that is used to continuously or occasionally power smart doorbell 100. Battery 110 may be designed to function within a defined temperature range. Performance of battery 110 outside of the defined temperature range may result in degraded performance and/or a reduction in the expected lifespan of battery 110. Battery 110 may be installed within a battery compartment located within housing 101 and may be connected with charging circuitry 115. Charging circuitry 115 may receive power from an external source, such as wired doorbell interface 170. In some embodiments, it may be possible that battery 110 is non-rechargeable and, therefore, may not be connected with charging circuitry 115; however, in many embodiments, battery 110 is rechargeable. Wired doorbell interface 170 may be connected with wires installed within a structure that connects to a power source and, possibly, an indoor chime unit. In a conventional doorbell, the doorbell may act as a switch that triggers a change in an analog or digital signal on the wires, which causes the indoor chime unit to make a sound, which, in turn, alerts a person located indoors as to the doorbell having been pushed. Charging circuitry 115 may be connected with an alternating current (AC) or direct current (DC) obtained from wires connected with wired doorbell interface 170. Charging circuitry 115 may convert a received alternating current to a direct current for use in charging battery 110. At various times, charging circuitry 115 may be disconnected from receiving power via the wires. At such time, smart doorbell 100 may rely exclusively on battery 110 for power. At other times, components of smart doorbell 100 may be powered directly and exclusively by charging circuitry 115 or may be powered by battery 110 while battery 110 is being recharged using charging circuitry 115. It should be understood that battery 110 and charging circuitry 115 may be able to supply power to all components of smart doorbell 100.

Battery 110 and, possibly charging circuitry 115, may be electrically connected with the various components of smart doorbell 100 that are powered. Therefore, while a connection is not shown as directly existing between battery 110, charging circuitry 115, and each other powered component of smart doorbell 100, it should be understood that the power for such components is received from battery 110, and possibly directly from charging circuitry 115.

Processing system 120 may include one or more processors and may serve to control functionality of smart doorbell 100. Processing system 120 may receive data and/or transmit data to various components of smart doorbell 100, such as wireless interface 125, charging circuitry 115, temperature sensor 130, infrared LEDs 135; IR filter 140; camera 145; button 150; speaker 155; and microphone 156.

Wireless interface 125 may receive data from processing system 120 and provide data to processing system 120. Wireless interface 125 may communicate using a wireless local area network (WLAN). Such a WLAN may communicate according to the IEEE 802.11 technical standards (WiFi). Other communication protocols are possible, such as Thread®, Zigbee®, or more generally any specification using the IEEE 802.15.4 technical standard. Other possible communication protocols can include Z-Wave® or Bluetooth®. Processing system 120 may transmit an indication of a doorbell button actuation via wireless interface 125 to a remote server and/or remote device via such a wireless network (or directly to the device). Wireless interface 125 may also be used for transmitting video and/or audio to a remote server device via wireless network or directly to the remote server and/or remote device. Wireless interface 125 may be used to receive audio that may be output via speaker 155.

One or more temperature sensors, such as temperature sensor 130, may be located within housing 101 of smart doorbell 100. Thermistors may be used as temperature sensor 130. In some embodiments, temperature sensor 130 may be located within a battery module, in which battery 110 is incorporated. The temperature measurements made by temperature sensor 130 may be used by processing system 120 to determine whether any actions should be taken to increase or decrease the temperature of battery 110. Temperature sensor 130 may be placed in the vicinity of battery 110. In some embodiments, multiple temperature sensors may be placed in different locations within housing 101 to obtain a more accurate measurement of the temperature within housing 101. For example, temperature sensors may be placed near battery 110, on a main circuit board of smart doorbell 100, and on a daughterboard of smart doorbell 100. Processing system 120 may perform various actions in response to the temperature measured by temperature sensor 130 being above or below various temperature thresholds. In some embodiments, only data from one or a subset of the temperature sensors may be used for determining functions that should be performed by smart doorbell 100 to control the smart doorbell's internal temperature, and specifically, the temperature of battery 110. For instance, data from some temperature sensors may only be used for reporting purposes while data from other temperature sensors may be used for reporting purposes and for controlling the internal temperature of smart doorbell 100. In some embodiments, temperature measurements may be averaged or otherwise analyzed in combination (e.g., use a maximum or minimum value) or combined (e.g., use a median value) for use in reporting and/or controlling the internal temperature of smart doorbell 100.

Processing system 120 may be in communication with IR LEDs 135. IR LEDs 135 may be used to illuminate, with infrared light, a field of view of camera 145. For instance, the field of view of camera 145 may be illuminated using infrared light from IR LEDs 135 at night when there is not enough natural light available to illuminate persons and objects present within the field of view. The brightness of IR LEDs 135 may be controlled by processing system 120. IR filter 140 may be actuated into position to block infrared light from being incident on an image sensor of camera 145. For instance, during the day, it may be desirable to block infrared light from entering a lens of camera 145 to increase the image quality captured of the field of view. However, at night, when infrared light from IR LEDs 135 is being used to illuminate the field of view, IR filter 140 may be actuated into a position such that light enters a lens of camera 145 without being filtered or blocked by IR filter 140.

Camera 145 may capture still images or video of a field of view in front of smart doorbell 100. Camera 145 may be used to capture a continuous feed of video, which may be transmitted by processing system 120 and wireless interface 125 to a remote server or device. In some embodiments, a video feed from camera 145 is only transmitted via processing system 120 and wireless interface 125 when button 150 has been actuated by a person ringing the doorbell. In some embodiments, a motion sensor or occupancy sensor (e.g., a passive infrared sensor) may be used to trigger when video is captured by camera 145 or transmitted by processing system 120 and wireless interface 125 to a remote device or system.

Button 150 can represent a doorbell button that may be pushed by a person. This person may be expecting the doorbell to ring or sound a chime within the house or otherwise alert the user to the presence of the person. In some embodiments, some other form of input device is present rather than button 150. For instance, a capacitive sensor, touch sensor, knob, lever, switch, or some other form of input device may be present. Processing system 120 may receive an indication when button 150 has been actuated. Speaker 155 may be used for outputting audio into a vicinity of smart doorbell 100. Speaker 155 may be used for outputting audio received via wireless interface 125 and processing system 120. For instance, a user may speak into a mobile device and have the audio output via speaker 155 to communicate with a person standing near smart doorbell 100. This may occur while the user is viewing video captured by camera 145 and listening to audio captured by microphone 156 and transmitted by processing system 120 and wireless interface 125.

In some embodiments, processing system 120 may transmit a message or signal to chime activation circuitry 160 which causes a message to be sent to a remote chime control unit to sound a chime in response to button 150 being actuated. Chime activation circuitry 160 may communicate using the same wires from which power is received by charging circuitry 115. In other embodiments, a wireless message may be transmitted using wireless interface 125. In such embodiments, the wireless message may be triggered by processing system 120 rather than dedicated chime activation circuitry 160. In some situations, a button press may not trigger a message or signal being transmitted, either wirelessly or via the wires, to trigger a chime being output. Whether a message or signal is transmitted may be based on several factors, including the measured temperature and the charge level of battery 110. Further detail regarding whether the chime is activated (e.g., in response to button 150 being actuated) is provided in relation to FIG. 9. In this document, "chime" refers to any sound that a doorbell system makes within a structure to signal that a doorbell outside of the structure has been pressed or actuated. Such a chime may be a bell ringing, a beep, a synthesized sound, a synthesized spoken message, a recording, or some other form of sound.

Figure 2B:
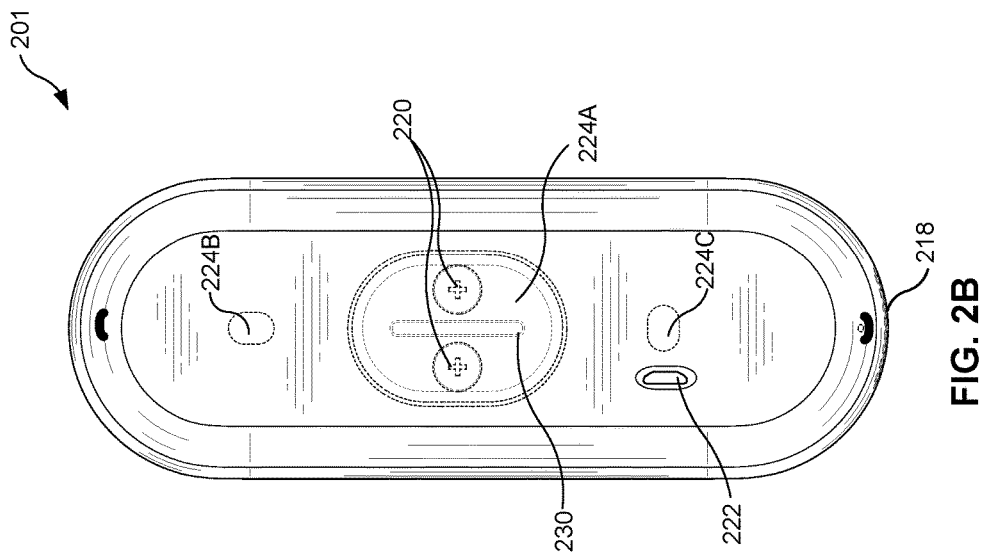
FIGS. 2A and 2B illustrate embodiments of a front and back, respectively, of a smart doorbell device.
Figure 2A:
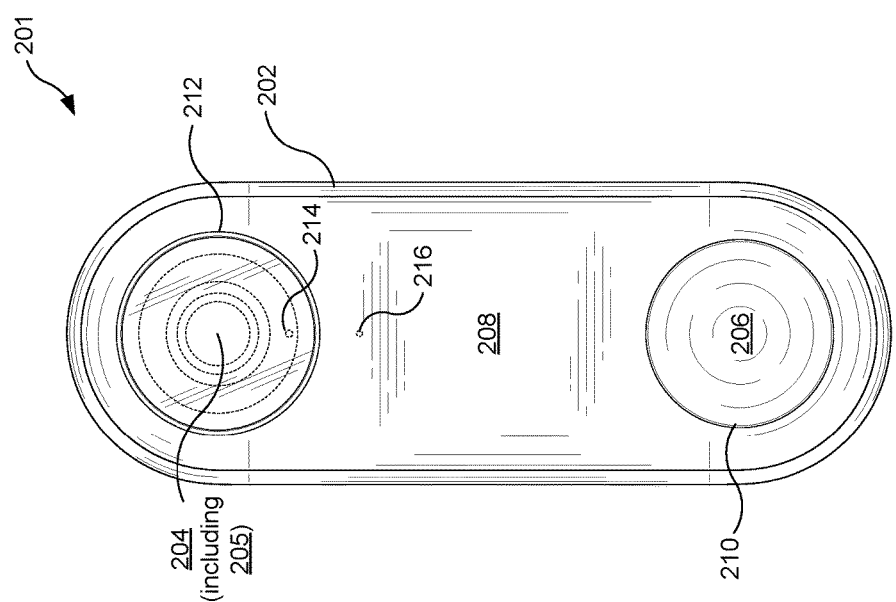

As previously noted, various forms of smart home devices or sensor devices may have features from the embodiments detailed herein incorporated. In some embodiments, the smart home device is a smart doorbell. FIGS. 2A and 2B illustrate embodiments of a front and back, respectively, of a smart doorbell 201. Smart doorbell 201 represents an embodiment of smart doorbell 100 of FIG. 1.

The smart doorbell 201 integrates a camera module and a doorbell system within a device housing 202 (which represents an embodiment of housing 101). The camera module includes a lens assembly 204 and an image sensor (which is part of camera 145) that are configured to capture images, and a wireless transceiver that is configured to exchange data with a remote server over one or more wireless communication networks. The doorbell system is configured to ring a remote chime device in response to a press on a button top 206 of a button assembly. The device housing 202 may have a substantially elongated shape. Optionally, the elongated shape has a width that is less than a width of most doorframes available in the market, such that the smart doorbell 201 can be directly mounted on a commonly available doorframe. In some implementations, the lens assembly 204 of the camera module is disposed within a top half of the device housing 202, and the button top 206 of the doorbell system is disposed on a bottom half of the device housing 202. When the smart doorbell 201 is mounted on a wall surface or a doorbell frame, the lens assembly 204 is located on top of the button top 206, thereby allowing a field of view of the lens assembly 204 to remain clear when a user presses the button top 206.

Referring to FIGS. 2A and 2B, in this example, the device housing 202 includes an elongated body and two semicircular ends, and the elongated body has a width substantially equal to a diameter of the two semicircular ends. The lens assembly 204 is concentric with a top one of the two semicircular ends, and the button top 206 is concentric with a bottom one of the two semicircular ends. Such physical arrangements not only create a more aesthetically pleasing look for the smart doorbell 201, but also ensure sufficient separation between the lens assembly 204 and the button top 206, thereby avoiding a user press on the button top 206 interfering with video recording of the camera module (e.g., by blocking the field of view of the lens assembly 204).

In some implementations, the device housing 202 includes a front cover plate 208 that seals at least a plurality of electronic components, lens assembly 204 and a button assembly within the device housing 202. Optionally, the front cover plate 208 has a peripheral edge that interfaces with a body of the device housing 202. The peripheral edge is configured to form a water tight seal with an edge of the body of the device housing 202, thereby preventing water from entering the device housing 202 through the interface between the front cover plate 208 and the body of the device housing 202.

The button top 206 is part of the button assembly, and is configured to receive the user press on the button assembly. The front cover plate 208 therefore includes a button opening 210 configured to expose the button top 206 of the button assembly on the front cover plate 208. The button top 206 has a first diameter that is substantially smaller than a second diameter of the button opening 210 of the front cover plate 208. The button top 206 can move vertically in a direction perpendicular to a plane of the button opening 210 (e.g., in a downward direction into or out of the device housing 202) when a user presses on the button top 206. The button assembly includes a flexible edge that surrounds the button top 206 and fills a gap between the button opening 210 and the button top 206. The flexible edge enables a range of motion for movement of the button top 206 with respect to the button opening 210 of the front cover plate 208. In some implementations, the flexible edge of the button assembly forms a water tight seal with an edge of the button opening 210 of the front cover plate 208, and prevents water from entering the device housing 202 via the button opening 210.

In some implementations, the front cover plate 208 of the device housing 202 is made of a single piece of material (e.g., glass or plastic). The single piece of material creates a more aesthetically pleasing look, reduces production costs by reducing the number of parts, reduces complexity by eliminating the need to tightly fit multiple sections, increases waterproofing of the device by eliminating seams between multiple sections, and increases a quality of the images captured by image sensors.

In some implementations, the front cover plate 208 includes a camera opening 212 configured to expose the lens assembly 204. The lens assembly 204 includes a cover glass 205 configured to protect the lens assembly 204. An edge of the cover glass 205 of the lens assembly 204 forms a watertight seal with an edge of the camera opening 212. Alternatively, in some implementations, the front cover plate 208 does not have the camera opening 212, but includes a substantially transparent area (or camera opening) 212 that is disposed on top of the lens assembly 204 to allow light (e.g., visible and infrared light) to enter the lens assembly 204. In some implementations, the camera opening or transparent area 212 has a size substantially larger than that of lenses of the lens assembly 204. By these means, the camera opening, which can be a transparent area of the front cover plate 208, does not become a limiting factor for a margin of a field of view of the smart doorbell 201, and the size of the lens assembly 204 determines the field of view for the smart doorbell 100. Stated another way, the margin of the field of view is limited by physical features of the lens assembly 204, rather than by the camera opening or transparent area 212 of the front cover plate 208. Such a substantially large camera opening or transparent area 212 enables a substantially wide angle view for the smart doorbell 201 when a wide angle lens assembly is applied.

In some implementations, the front cover plate 208 includes a substantially opaque area that is distinct from the substantially transparent area of the camera opening 212. An interior surface of the substantially opaque area is painted with dark color ink (e.g., black ink). The dark color ink could be transparent to infrared light, such that the substantially opaque area is opaque to visible light and transparent to infrared light. In an example, the interior surface of the front cover plate 208 is entirely covered by the ink except the button opening 210 exposing the button top 206 and the substantially transparent area (camera opening) 212 covering the lens assembly 204. Further, in some implementations, the smart doorbell 201 includes an array of IR LEDs, which can, more generally, be IR illuminators (not shown in FIGS. 2A and 2B). The IR LEDs can be disposed below any portion behind the substantially opaque area. The IR illuminators are concealed under the front cover plate 208, but light generated by the IR illuminators can still penetrate the front cover plate 208 to illuminate the field of view of the smart doorbell 201.

In some implementations, the smart doorbell 201 further includes an ambient light sensor (ALS) assembly 214 at least partially disposed within the lens assembly 204. The ALS assembly 214 is configured to measure the amount of light entering the lens assembly 204 from an ambient environment surrounding the lens assembly 204. Part of the ALS assembly 214 is exposed to incoming light, and therefore, visible from a front of the smart doorbell 201 in the lens assembly 204. The ALS assembly 214 is configured to compare the measured amount of light to a threshold illumination level, and the doorbell camera uses corresponding comparison results to determine its operation mode between a daytime mode and a night mode. Specifically, in some situations, the ALS assembly 214 determines that the amount of light entering lens assembly 204 exceeds the threshold illumination level, and the smart doorbell 201 enables the daytime mode in which the IR illuminators are turned off. Alternatively, in some situations, the ALS assembly 214 determines that the amount of light entering the lens assembly 204 is not greater than the threshold illumination level, and the smart doorbell 201 enables a night mode in which the IR illuminators are optionally turned on to illuminate the field of view of the smart doorbell 201. In some implementations, two distinct threshold illumination levels are applied to enable a first type of switching from the daytime mode to the night mode and a second type of switching from the night node to the daytime mode. Thus, use of the ALS assembly 214 can be used to cause switching between the daytime and night modes and enable/disable the IR illuminators in an efficient manner.

The smart doorbell 201 may further include a microphone and a speaker. In some implementations, the front cover plate 208 includes a microphone aperture 216 to allow sound signals to reach the microphone concealed within the smart doorbell 201. In some implementations, the device housing 202 includes a plurality of speaker openings 218 at its bottom rim surface. When the smart doorbell 201 is mounted onto a wall or doorframe surface, the speaker openings 218 are not visible from a gaze of a visitor approaching or standing near the surface, while still being able to broadcast audio messages to the visitor. In embodiments where the smart doorbell 201 includes both the microphone and the speaker, a remote user may review live video streams captured by the camera module of the smart doorbell 201, and have a conversation in real-time with the visitor.

In some implementations, both the microphone and the speaker of the smart doorbell 201 adopt waterproof features to deter water permeation into the electronic components within the device housing 202 and cause irreversible damages to the electronic components. Specifically, the waterproof features may be integrated at the microphone aperture 216 and speaker opening 218 to deter water permeation (such as from a jet or stream of water impinging on at least one of the microphone aperture 216 and speaker opening 218). In an example, the microphone may be disposed inside the device housing 102, and may include a sound input region offset from the microphone aperture 216. A hydrophobic membrane is affixed to a first interior surface of the device housing 202 and covers the microphone aperture 216 thereon. The hydrophobic membrane is configured to allow transmission of sound waves and block water intrusion from the microphone aperture 216. A sound transmission channel couples the sound input region of the microphone to the microphone aperture 216 on the front cover plate 208. The sound transmission channel is configured to allow sound waves transmitted through the microphone aperture 216 and the hydrophobic membrane to be coupled to the sound input region of the microphone without exposing the sound input region to damaging pressures due to environmental impacts on the smart doorbell 201. In some implementations, the speaker may also adopt a sound input region offset from the speaker openings 218 and a respective hydrophobic membrane to block water intrusion while allowing transmission of sound waves from the speaker openings 218 to the sound input region of the speaker. More details of some examples of waterproof microphones and speakers are discussed in U.S. patent application Ser. No. 15/209,735, filed Jul. 13, 2016, titled "Magnetic Mount Assembly of a Camera," which is hereby incorporated by its entirety.

Referring to FIG. 2B, in some implementations, a rear exterior surface of the device housing 202 provides an access to at least one of a plurality of wire terminals 220 and an electrical connector 222 (e.g., a Universal Serial Bus (USB) connector). The plurality of wire terminals 220 includes a first terminal and a second terminal configured to receive a power supply line and a ground line for driving the plurality of electronic components contained within the device housing. Specifically, in an example, each of the power supply line and the ground line includes a respective fork terminal coupled to a corresponding wire terminal 220, and fixed thereto by tightening a screw fastener. Under some circumstances, the smart doorbell 201 is mounted on a wall or doorframe surface in place of a conventional doorbell, and the plurality of wire terminals 220 is coupled to receive the power supply line and the ground line that were applied to drive the conventional doorbell.

Alternatively, in some implementations, the electrical connector 222 is coupled to one or more electrical wires for receiving a power supply or exchanging data with another electronic device. In an example, both the plurality of wire terminals 220 and the electrical connector 222 are available on the rear exterior surface of the device housing 202. The electrical connector 222 is only connected in a factory for testing, calibrating and/or setting up the smart doorbell 201, while the plurality of wire terminals 220 is applied to provide the power supply in the factory and/or after the smart doorbell 201 is shipped to a customer.

In some implementations, the rear exterior surface of the device housing 202 includes a plurality of recesses 224. For example, the plurality of wire terminals 220 is disposed within a first recess 224A, and separated by a separation 230 that protects the lines connected to the first and second terminals of the plurality of wire terminals 220 from being shorted to each other. A height of the separation 230 may be smaller than a depth of the first recess, and the depth of the first recess 224A is configured to be greater than a height of a connection formed between the plurality of wire terminals 220 and the power supply or ground line. Specifically, in the above example, when the screw fastener is used to fix the fork terminal of the power supply or ground line onto one of the plurality of wire terminals 220, the depth of the first recess 224A is configured to be greater than a total height summing a thickness of the fork terminal and a height of a screw head of the screw fastener. As such, when the power supply and ground lines are connected (i.e., tightened) to the plurality of wire terminals 220, the lines extend beyond the first recess 224A, while the corresponding connections (i.e., at the plurality of wire terminals 220) do not rise beyond the rear exterior surface of the device housing 202.

Figure 3A:
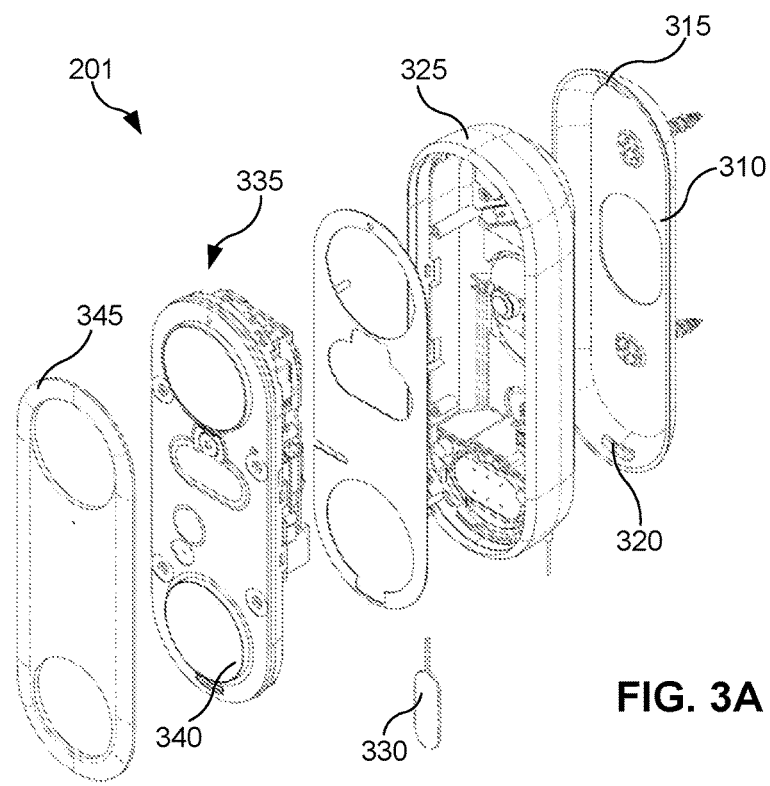
FIGS. 3A and 3B illustrate embodiments of an exploded front view and exploded back view of a smart doorbell device.
Figure 3B:
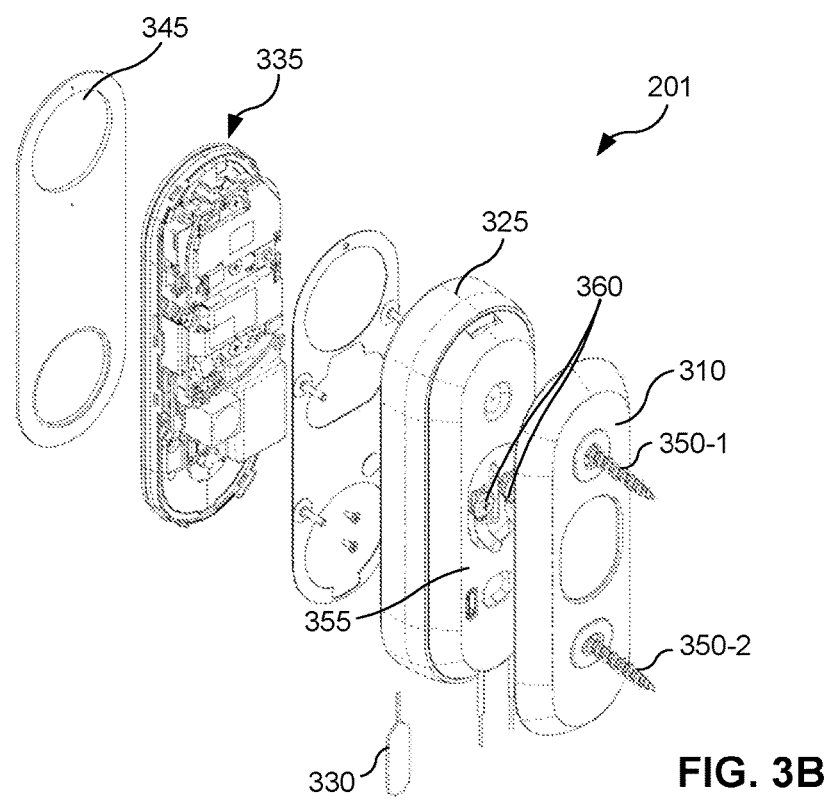

FIGS. 3A and 3B illustrate embodiments of an exploded front view and exploded back view of a smart doorbell device. The smart doorbell 201 and mounting plate 310 are fixed on a mounting surface (e.g., a wall or doorframe surface) via fasteners 350 (350-1, 350-2). A rear surface 355 of the mounting plate 310 adheres to the surface, and the plurality of wire terminals 360 is covered by the smart doorbell 201 (e.g., entirely concealed between the smart doorbell 201 and the surface). When the smart doorbell 201 is fixed onto the surface, a lens assembly 204 of the smart doorbell 201 faces away from the surface for capturing images of a field of view (i.e., a camera scene), and a button top 340 sits on a front surface of the doorbell camera and receives a user press for activating a remote chime device.

In some implementations, the device housing 325 is mechanically fixed onto the mounting plate 310 when a first fastener structure 320 located at a front surface of the mounting plate 310 is fastened to a second fastener structure located at the rear exterior surface of the device housing 325. In a specific example, the first fastener structure 320 includes a snap fastener configured to lock onto the respective fastener structure of the device housing 325. The mounting plate 310 may further include a hole. The hole may be located on or in proximity to the raised edge of the mounting plate 310, allowing a release tool 330 to access the hole when a flat portion of the rear surface of the mounting plate 310 adheres to the mounting surface. The hole may be located on or in proximity to the first fastener structure 320. The release tool 330 may have an extended long apical part that fits into the hole. The release tool 330 can be inserted into the hole to gain an access to the first fastener structure 320 or the second fastener structure that mates with the first fastener structure 320 when the device housing 325 is mechanically fixed onto the mounting plate 310. The first fastener structure 320 and the second fastener structure are unfastened from each other when the release tool 330 is inserted into the hole and applies an unlocking action (e.g., a press and a twist) on them.

In some implementations, a microphone aperture 216 is located on a front cover plate 345 of the smart doorbell 201 to allow sound waves to reach a microphone concealed behind the front cover plate 345. A plurality of speaker openings 218 may be located at a bottom rim surface of the device housing 325 of the smart doorbell 201, and configured to broadcast audio messages (e.g., coming from a remote client device) to a visitor near the mounting surface. When the smart doorbell 201 is mounted onto the mounting surface, the speaker openings 218 are not visible from a gaze of the visitor as the visitor is approaching or standing near the mounting surface. Also, the speaker openings 218 may be configured to face down towards a ground to prevent water and dust from dropping into a speaker box via the speaker openings 218. Given that the smart doorbell 201 includes both the microphone and the speaker, a remote user may have a full duplex audio session (i.e., receiving audio messages from the visitor and sending audio message to the visitor) with the visitor via the smart doorbell 201, while reviewing live video streams captured by the camera module of the smart doorbell 201 on the remote client device associated with the remote user.

Referring to FIGS. 3A and 3B, the smart doorbell 201 may include a stack 335 of electronic and optical components. Stack 335 may include one or more batteries, such as battery 110 of FIG. 1. Stack 335 may further include: charging circuitry 115, temperature sensor 130, processing system 120, wireless interface 125, camera 145, speaker 155, and/or microphone 156. The stack 335 is securely enclosed within the device housing 325 when the front cover plate 345 is assembled onto a body of the device housing 325. In some implementations, the stack 335 of electronic and optical components is assembled prior to being enclosed within the device housing 325. In some implementations, the electronic and optical components are sequentially disposed into the body of the device housing 325 to form the stack 335 that is thereby enclosed within the device housing 325 when the front cover plate 345 is assembled onto the body of the device housing 325.

Figure 4:
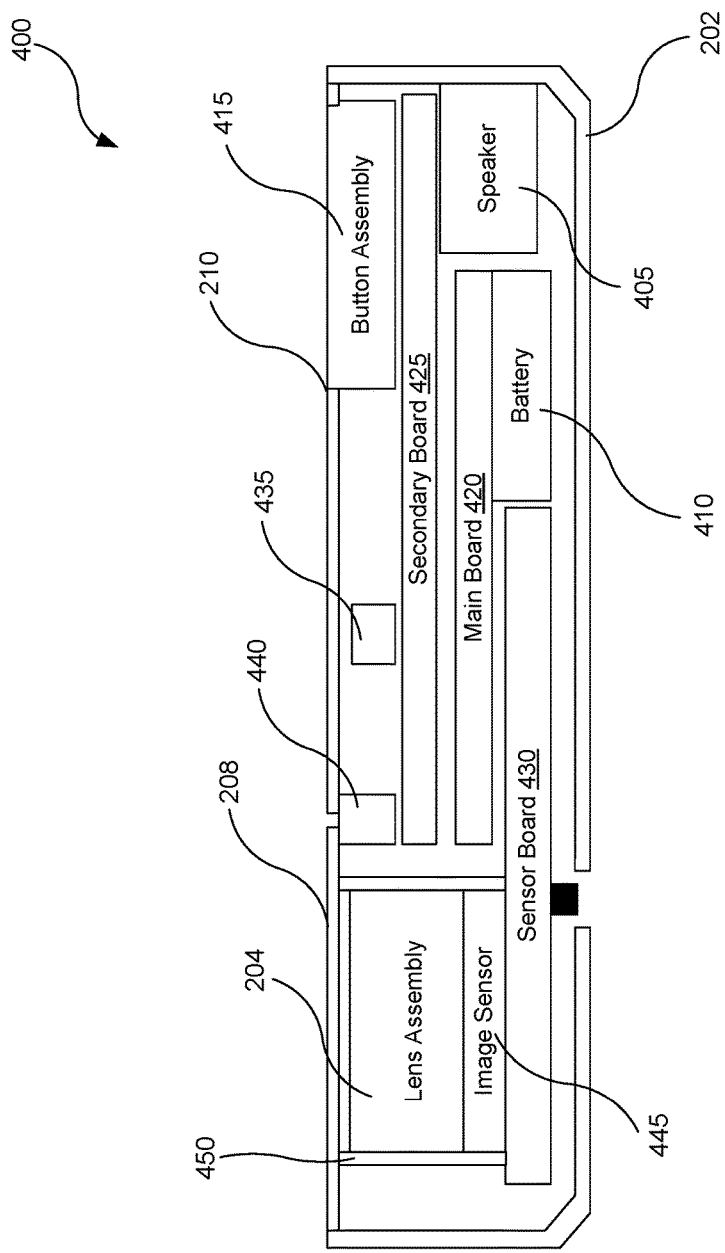
FIG. 4 illustrates an embodiment of a side view of a smart doorbell device.

FIG. 4 illustrates a block diagram cross-section 400 of smart doorbell 201. The smart doorbell 201 includes a device housing 202 that encloses a plurality of electronic and optical components. The device housing 202 further includes a front cover plate 208 having a button opening 210. A waterproof button assembly 415 is formed in the button opening 210 on the front cover plate 208 of the device housing 202, and a button top 706 of the button assembly 415 is exposed from the button opening 210.

The front cover plate 208 of the device housing 202 may be made of a single piece of material (e.g., glass and plastic) having the button opening 210, or a stack of material pieces (e.g., each made of glass or plastic) that is aligned and has the button opening 210. In some implementations, the front cover plate 208 includes a camera opening 212 configured to expose the lens assembly 204. A top edge of the lens assembly 204 (e.g., a periphery of a cover glass 205 of the lens assembly 204) forms a water tight seal with an edge of the camera opening 212. Alternatively, in some implementations, the front cover plate 208 may not have the camera opening, but includes at least a substantially transparent area 212. The lens assembly 204 is disposed under the substantially transparent area 212 to receive light (e.g., visible and infrared light) passing through the transparent area 212.

Further, in some implementations, the front cover plate 208 includes a microphone aperture 716, and a microphone 440 (which can represent an embodiment of microphone 156) is disposed under the front cover plate 208 and coupled to the microphone aperture 716 to receive sound waves entering the microphone aperture 716.

In some implementations, the front cover plate 208 is substantially opaque except the button opening 210, the microphone aperture 716, and the camera opening (or transparent area) 212. In some implementations, the front cover plate 208 includes a substantially opaque area that is distinct from the button opening 210, the microphone aperture 716 and the camera opening (or transparent area) 212. The microphone 440 is optionally concealed under the substantially opaque area. Further, in some implementations, an array of IR illuminators 435 (which can represent IR LEDs 135) is disposed under the substantially opaque area of the front cover plate 208 and configured to illuminate a field of view of the lens assembly 204 with infrared light. In an example, the array of IR illuminators 435 includes a number of (e.g., twelve) LEDs arranged in a row. The row of IR illuminators 435 provides adequate illumination without producing a bright red/visible glow that may result from fewer and/or more powerful IR illuminators. In some implementations, the lens assembly 204 is supported by a lens holder 450 within the device housing 202, and the lens holder 450 has a top edge raised towards the front cover plate 208 for blocking the infrared light generated by the array of IR illuminators 435 from entering the lens assembly 204 directly.

In some implementations, the IR illuminators 435 include IR LEDs having a wavelength of 940 nanometers. In some implementations, the IR illuminators 435 include IR LEDs having a wavelength of 850 nanometers. In some implementations, the image sensor for the smart doorbell 201 is less sensitive to 940 nm light than it is to 850 nm light. Therefore, IR LEDs having a 940 nm wavelength cause less interference with the image sensor than IR LEDs having an 850 nm wavelength. Further, in some implementations, a heat spreader is coupled to the IR illuminators 435 to dissipate heat generated therefrom. Such heat dissipation may be useful in using IR illuminators 435 to heat rechargeable battery 410 (which can represent an embodiment of battery 110).

The smart doorbell 201 may further include a speaker 405 contained within a speaker box 1136 that is further disposed in proximity to speaker holes 718. Speaker 406 can represent an embodiment of speaker 155. When the speaker holes 718 are located on a bottom rim surface of the device housing 202, the speaker 405 is placed behind the button assembly 415 and faces the speaker holes 718. Given that the smart doorbell 201 includes both the microphone 440 and the speaker 405, a remote user may review live video streams captured by the camera module of the smart doorbell 201, and have a conversation in real-time with the visitor. It is also desirable that the smart doorbell 201 can provide dynamic audio feedback to a user via the microphone 440 and the speaker 405. The feedback may concern an operational status of the smart doorbell 201 itself, a status of the outdoor environment surrounding the smart doorbell 201, the operational status of another electronic device associated with the smart doorbell 201, and/or the operational status of a set of electronic devices associated with the doorbell camera. For ease of references, the speaker 405 and the speaker box 1136 are collectively called the speaker 405 in this application.

In some implementations, the lens assembly 204 includes a cover glass, a camera lens structure and an infrared filter (which can represent an embodiment of IR filter 140). The IR filter is activated in the daytime mode for precise color reproduction, and disabled in the night mode for greater light sensitivity when the field of view of the smart doorbell 201 is illuminated by the IR illuminators 435. Optionally, the ALS assembly 714 is also used to cause switching between the daytime and night modes, and enable/disable the IR illuminators 435 and the infrared filter. In some implementations, the lens holder is supported by the infrared filter to protect lenses in the lens assembly 204 from being pushed when a user touches or presses the front cover plate 208.

The smart doorbell 201 may include at least a sensor board 430, a main board 420 and a secondary board 425 that are stacked within the device housing 202. In some implementations, the sensor board 430 includes a connector that is coupled to another connector of the main board 420 directly. Temperature sensor 130 may be present on sensor board 430, main board 420, or secondary board 425. Alternatively, multiple temperature sensors may be present on one or more of sensor board 430, main board 420, or secondary board 425. Alternatively, a flexible cable is optionally connected between the main board 420 and the sensor board 430. In some implementations, two ends of a flexible printed circuit (FPC) 1126 are electrically coupled to a respective connector at the main board 420 and the secondary board to couple them to each other.

The sensor board 430 optionally sits on a rear interior surface of the device housing 202. An image sensor array 445 may be disposed on top of an end of the sensor board 430, and the lens assembly 204 may be further disposed on top of the image sensor array 445, such that light passing through the lens assembly 204 arrives at the image sensor array 445 to form an image captured by the image sensor array 445. In some implementations, the sensor board 430 includes an image processor. The image processor of the sensor board 430 is optionally located directly below the image sensor array 445 to facilitate further processing of the image captured by the image sensor array 445. In some implementations, the sensor board 430 also includes a connector for communicatively coupling the sensor board 430 to the image sensor array 445. In some implementations, the image sensor array 445 and/or the image processor of the sensor board 430 is thermally coupled to a heat spreader 1138 that is disposed under the image sensor array 445 and configured for dissipating heat generated while images are being captured and processed.

In some implementations, the main board 420 includes at least a central processing unit (CPU), and a memory system (e.g., including memory and a memory controller). In an example, the main board 420 includes a system on chip (SoC), a memory (e.g., double data rate synchronous dynamic random-access memory (DDR SDRAM)), a memory controller, and an electromagnetic interference (EMI) fence. In some implementations, the EMI fence, in conjunction with EMI shielding, is adapted to substantially prevent electromagnetic interference with the SoC, the memory and/or the memory controller from outside sources.

Further, in some implementations, a rechargeable battery 410 is mounted on the main board 420 (optionally via a connector 1415). The main board 420 may be flipped and bonded to the sensor board 430. When the main board 420 is offset from the sensor board 430, the rechargeable battery 410 may be positioned beside the sensor board 430 and takes advantage of compact space within the device housing 202. In some implementations, the sensor board 430 regulates supply voltages provided via the plurality of wire terminals 220, while the main board 420 manages operation of the rechargeable battery 410 and provides power to the sensor and secondary boards when the external power supply is not available. The main board 420 may include a charger circuit that is configured to manage operation of the rechargeable battery 410. In some implementations, the rechargeable battery 410 is disabled from being charged in accordance with a determination that a temperature of the rechargeable battery is greater than a first threshold temperature (e.g., 60° C.). In some implementations, a heater is disposed in proximity to the rechargeable battery 410, and the heater is enabled to heat the rechargeable battery 410 in accordance with a determination that the temperature of the rechargeable battery is less than a second threshold temperature (e.g., 0° C.). The heater is disabled from heating the rechargeable battery in accordance with a determination that the temperature of the rechargeable battery is equal to or greater than the second threshold temperature.

In some implementations, the main board 420 includes a power management integrated circuit (PMIC) that is configured to manage power provided by the sensor board 430 and/or the rechargeable battery 410. The main board 420 may also include one or more storage capacitors (e.g., a capacitor 4204) that are configured to enable operation of the PMIC or the charger circuit.

In some implementations, the smart doorbell 201 is configured to switch between an offline mode and an online mode to preserve power of the rechargeable battery 410. For example, the smart doorbell 201 determines that it is disconnected from an external power and operates at the power of the rechargeable battery 410. In response to the determination, the smart doorbell 201 disables itself from the online mode that involves communication with the remote server and the client device, and enables the offline mode that operates locally to conserve the power of the rechargeable battery 410. Additionally, in accordance with a determination that it is disconnected from an external power and operates at the power of the rechargeable battery 410, the smart doorbell 201 sends a notification to the client device via the remote device, before or while switching from the online mode to the offline mode. In some situations, a visitor presses the button 706 of the smart doorbell 201 when it is offline. The smart doorbell 201 records a timestamp corresponding to a time when the user press occurs, and uploads the timestamp to the remote server and notifies the client device that someone has pressed the door when the smart doorbell 201 operates in the online mode again. Conversely, when the smart doorbell 201 determines that it is connected to an external power, it charges the rechargeable battery 410 and enables the online mode that involves communication with the remote server and the client device.

The secondary board 425 may include at least one or more wireless transceiver circuit 4252, IR illuminator drivers 4254, LED indicator driver, and an audio signal processor 4256. The secondary board 425 may be disposed on top of the main board 420, and surrounded by the microphone 440, the IR illuminators 435, the button assembly 415, and the speaker 405. Due to such arrangements of their locations, the secondary board 425 can conveniently receive signals from or send signals to these components 415-430 surrounding the secondary board 425.

In some implementations, the smart doorbell 201 includes a plurality of radios each of which is configured for one of broadband (e.g., Wi-Fi, cellular, etc.) communications, point-to-point (e.g., Bluetooth) communications, and mesh networking (e.g., Thread, Zigbee, ZWave, IEEE 802.15.4, etc.) communications. The plurality of radios is coupled to antennas. For example, an IEEE 802.15.4 antenna is disposed at a curved edge of the secondary board 425 and in proximity to the lens assembly 204, and a WiFi antenna (not shown in FIGS. 11A-11E) is disposed at a flat edge of the secondary board 425. In some implementations, EMI fencing is applied around the radios to minimize electromagnetic interference (e.g., from outside sources or between various components such as between any two of the radios). In some implementations, the EMI fencing is configured to substantially isolate the corresponding electrical components from sources outside of the EMI fencing. In some implementations, the EMI shielding is adapted to transfer heat from the sensor board 430 or the secondary board 425 to device housing. In some implementations, the EMI fencing is composed of aluminum and/or an aluminum alloy. In some implementations, the EMI shielding is configured to affix (e.g., snap) to the corresponding EMI fencing.

In some implementations, the image sensor array 445 is configured to capture IR light (e.g., IR light having a wavelength of 940 nm or 850 nm). In some implementations, the IR light is converted to white light for display to a user. In some implementations, the IR illuminators 435 consist of a row of twelve IR LEDs. In some implementations, the wavelength of the IR illuminators 435 can be selected or adjusted to be further from the visible spectrum. For example, the wavelength of the IR illuminators may be 940 nm rather than 850 nm. Having the IR illuminators be further from the visible spectrum of light means that the IR illumination from the illuminators is less visible (or invisible) to the human eye. In some implementations, the image sensor is tuned to 850 nm IR light, rather than 940 nm IR light. In some implementations, the IR illuminators 435 are configured to emit 940 nm light and operate with increased power (e.g., double the power) to provide similar illumination to the image sensor (e.g., an image sensor tuned for 850 nm IR light) as would be provided by IR illuminators configured to emit at 850 nm. Therefore it is important that the IR illuminators are used as efficiently as possible. For example, the IR illuminators are configured to only illuminate the portion of the scene that is captured by the image sensor.

In some implementations, the image sensor 445 has a rectangular field of view corresponding to +/−32 degrees vertical and +/−56 horizontal. In some implementations, the IR illuminators 435 are configured to emit light in a hemispherical pattern. Therefore, there is a need to direct and shape the light from the IR illuminators to illuminate the image sensor's field of view, while minimizing illumination outside of the field of view and overlap between IR illuminators causing hot spots in the sensed image.

Figure 5:
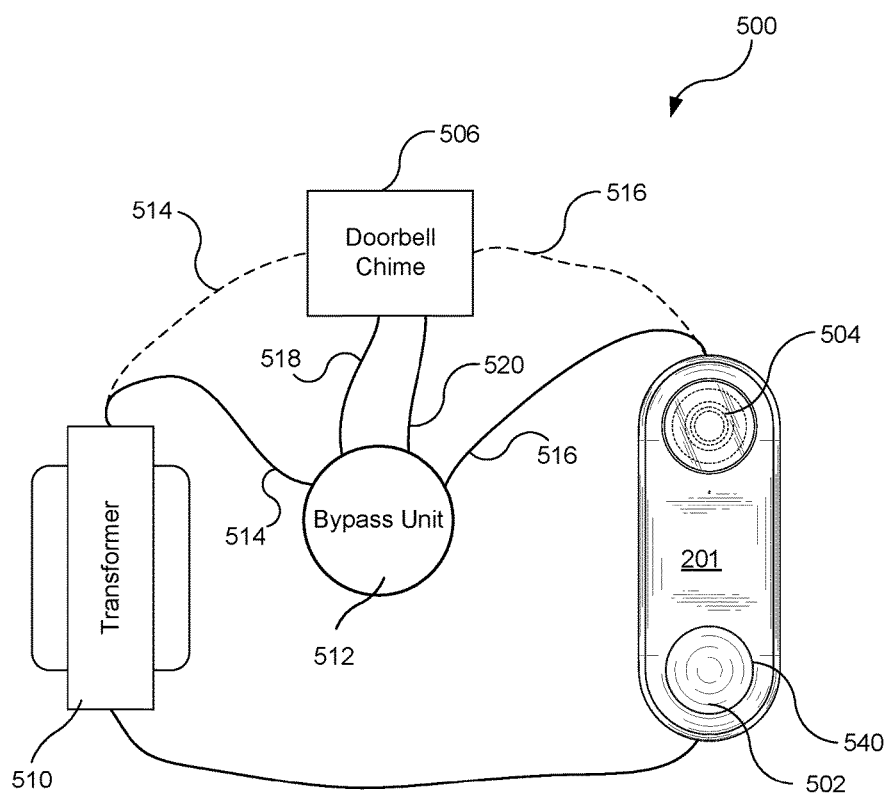
FIG. 5 illustrates an embodiment of a smart doorbell device integrated as part of a wired doorbell chime system.

FIG. 5 illustrates an embodiment of a smart doorbell device integrated as part of a wired doorbell chime system. The doorbell camera system 500 includes a smart doorbell 201 having a doorbell button 502, a camera module 504, an LED indicator, a speaker, a microphone, a processor and memory including programs executed by the processor. The camera module 504 further includes a lens assembly 704 and an image sensor array that are configured to capture images at a premises, and a wireless transceiver that is configured to exchange data with a remote server over one or more wireless communication networks. The doorbell button 502 is configured to trigger a remote chime 506 in response to a user press on a button top 702. In some implementations, the LED indicator is configured to illuminate through a peripheral edge 540 of the doorbell button 502 that surrounds the button top 702.

The smart doorbell 201 can be electrically coupled to the remote chime 506 via a bypass unit 512 powered by a transformer 510 that provides an input AC voltage (e.g., by converting a mains power supply of 120 V to the input AC voltage of 12 V, 16 V or 24 V). The remote chime 506 is configured to ring in response to a press on the doorbell button 502 in certain conditions. In some circumstances, a conventional doorbell is electrically coupled to the remote chime 506 that is further coupled to the transformer 510. The remote chime 506 is disconnected from the transformer 510 and the doorbell, and replaced by the bypass unit 512. Stated another way, wires 514 and 516 that are used to couple the doorbell chime 506 for the conventional doorbell are reconnected to the bypass unit 512. The bypass unit 512 has two additional wires 518 and 520 that are further connected to the remote chime 506. In some implementations, the bypass unit 512 is disposed in proximity to the remote chime 506, e.g., within the same chime box that contains the remote chime 506. As such, the bypass unit 512 is configured to receive the input AC voltage provided by the transformer 510 via the wire 514.

The doorbell camera system 500 may be configured to generate a supply monitoring signal based on the input AC voltage to indicate whether the input AC voltage is greater than a supply threshold. Optionally, the supply monitoring signal is generated when the user of the smart doorbell 201 is pressing the doorbell button 502. Optionally, the supply monitoring signal is generated by the bypass unit 512 or the smart doorbell 201.

In some implementations, the smart doorbell 201 alternates between a first camera mode and a second doorbell mode during its normal operation. The bypass unit 512 is configured to operate in the first camera mode when it is determined that no user press has been applied to the button. Specifically, during the first camera mode, the bypass unit 512 allows AC current to bypass the remote chime 506 (e.g., by the bypass circuit 512C) while coupling the camera module 504 of the smart doorbell 201 to the transformer 510 to receive power therefrom. It is noted that when the remote chime 506 is bypassed, the remote chime 506 is electrically coupled to the bypass unit 512 and the transformer 510 while still letting pass a substantially low current that is less than a threshold chime current and does not activate the remote chime 506 to ring. In addition, the bypass unit 512 is configured to operate in the second doorbell mode in accordance with a determination that a user press has been applied to the button. In the second doorbell mode, the bypass unit 512 enables the remote chime 506 to ring while coupling the smart doorbell 201 to the transformer 510 (e.g., by the bypass circuit 512C). Thus, in the absence of any user press on the doorbell button 502, the bypass unit 512 ensures the AC current that flows through the camera module 504 bypasses (e.g., mutes) the remote chime 506; conversely, at the time of a user press on the doorbell button 502, the bypass unit 512 forces the AC current to drive both the remote chime 506 in response to the camera module 504 switching into a low-impedance state to activate the remote chime.

In some implementations, the camera module 504 is continuously powered by the input AC voltage generated by the transformer 510 during both the first camera mode and the second doorbell mode, independently of whether a user pressed the doorbell button 502. By these means, the camera module 504 captures images while awaiting a user press, and does not cease capturing images while the remote chime 506 rings in response to the user press while the remote chime 506 rings in response to the user press.

In some implementations, the smart doorbell 201 may include a rechargeable battery. In the second doorbell mode, the camera module 504 of the smart doorbell 201 is electrically decoupled from the transformer 510, and relies on the rechargeable battery (e.g., a battery 1116 in FIGS. 11A-11E) to power the camera module 504 when the button 706 is being pressed (i.e., at a second doorbell mode). The battery is recharged when the button 706 (or the doorbell button 502) is not pressed at the first camera mode. The battery is sized big enough so that it can charge back up in between button presses. Stated another way, the battery may be recharged between the button presses to reach a power level that is sufficient to sustain operation of the camera module 504 during a subsequent press on the doorbell button 502. In some implementations, the battery is configured to sustain a predetermined number (e.g., 100) of continuous presses on the button of the smart doorbell 201 without losing battery power. As detailed in relation to FIG. 7, in certain circumstances, sounding of the chime is not performed such that the smart doorbell 201 does not need to operate exclusively from battery power.

In some implementations, in response to a user press on the doorbell button 502, the speaker of the smart doorbell 201 may play a pre-programmed ring chime, before the remote chime 506 rings or concurrently while the remote chime 506 is ringing. In some implementations, how the speaker of the smart doorbell 201 and the remote chime 506 function may be determined according to a home structure state (e.g., at home, away, sleeping). For example, if the home structure state is set or detected as "sleeping," the speaker of the smart doorbell 201 plays the pre-programmed ring chime or an audio message associated with the home structure state, while the remote chime 506 remains silent. Moreover, a message may be sent to a client device that executes a user mobile application in association with the smart doorbell 201, indicating that the user has pressed the doorbell button 502 of the smart doorbell 201 at a certain time. In some implementations, the smart doorbell 201 may prompt a visitor to record an audio message, and send the audio message and a timestamp associated with the press on the doorbell button 502 to the server system 164 and further to the user mobile application of the client device.

Figure 6:
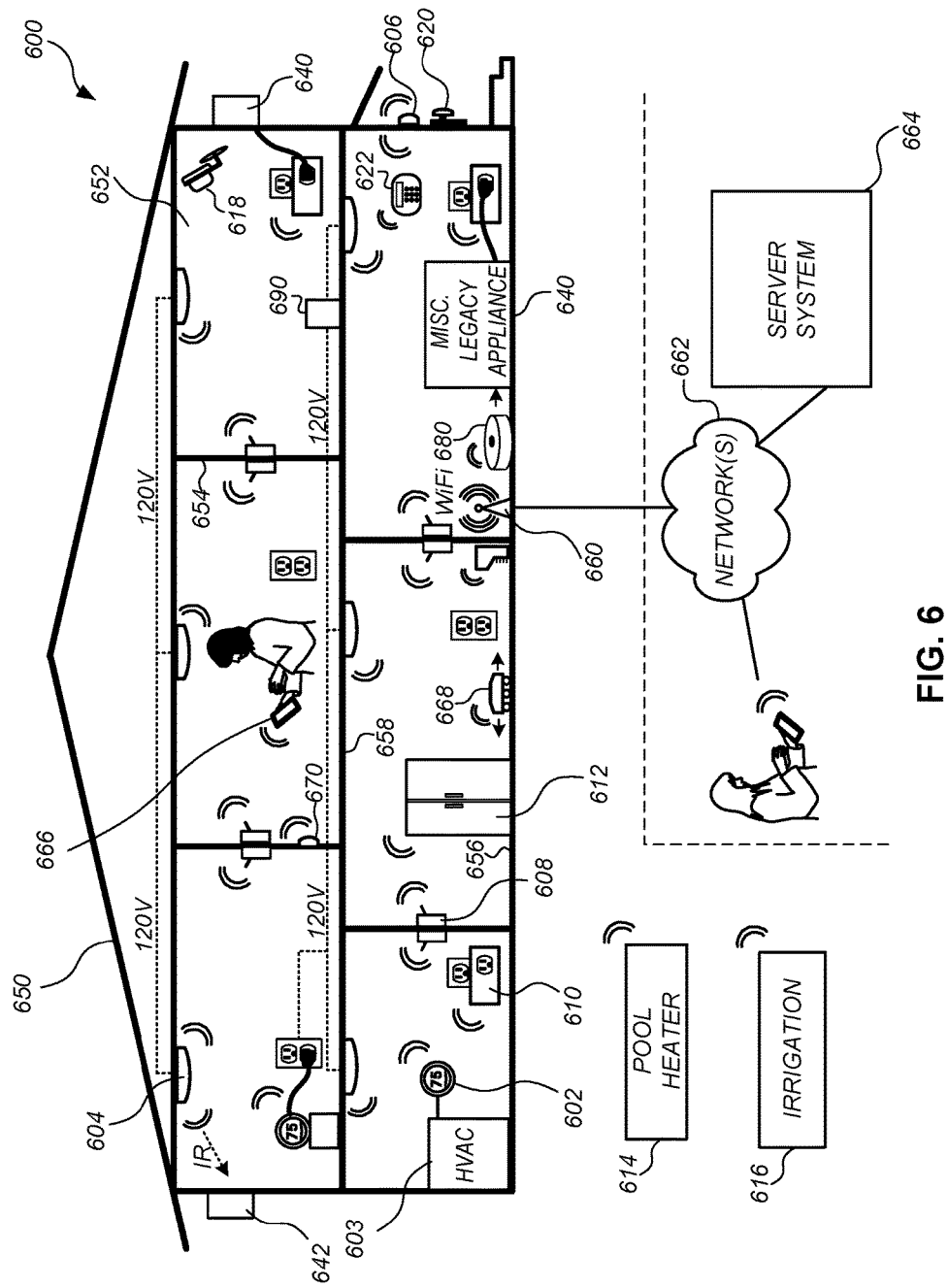
FIG. 6 illustrates an embodiment of a smart home environment.

FIG. 6 illustrates an embodiment of a smart home environment in which various smart home devices may have features incorporated to increase and/or decrease temperature of a battery of the smart home device and/or other internal components. Various smart home devices, including those located indoors or outdoors, may benefit from the ability to at least partially affect or control their internal temperature, such as the temperature of an internal battery.

The smart home environment 600 includes a structure 650 (e.g., a house, daycare, office building, apartment, condominium, garage, or mobile home) with various integrated devices. It will be appreciated that devices may also be integrated into a smart home environment 600 that does not include an entire structure 650, such as an apartment or condominium. Further, the smart home environment 600 may control and/or be coupled to devices outside of the actual structure 650. Indeed, several devices in the smart home environment 600 need not be physically within the structure 650. For example, a device controlling a pool heater monitor 614 or irrigation system monitor 616 may be located outside of the structure 650.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 650 includes a plurality of rooms 652, separated at least partly from each other via walls 654. The walls 654 may include interior walls or exterior walls. Each room may further include a floor 656 and a ceiling 658. Devices may be mounted on, integrated with and/or supported by a wall 654, floor 656 or ceiling 658.

In some implementations, the integrated devices of the smart home environment 600 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 600 may include one or more intelligent, multi-sensing, network-connected thermostats 602 (hereinafter referred to as "smart thermostats 602"), one or more intelligent, network-connected, multi-sensing hazard detection units 604 (hereinafter referred to as "smart hazard detectors 604"), one or more intelligent, multi-sensing, network-connected entryway interface devices 606 and 620 (hereinafter referred to as "smart doorbells 606" which can refer to smart doorbell 100 and/or 201 and "smart door locks 620"), and one or more intelligent, multi-sensing, network-connected alarm systems 622 (hereinafter referred to as "smart alarm systems 622").

In some implementations, the one or more smart thermostats 602 detect ambient climate characteristics (e.g., temperature and/or humidity) and control an HVAC system 603 accordingly. For example, a respective smart thermostat 602 includes an ambient temperature sensor.

The one or more smart hazard detectors 604 may include thermal radiation sensors directed at respective heat sources (e.g., a stove, oven, other appliances, a fireplace, etc.). For example, a smart hazard detector 604 in a kitchen 653 includes a thermal radiation sensor directed at a stove/oven 612. A thermal radiation sensor may determine the temperature of the respective heat source (or a portion thereof) at which it is directed and may provide corresponding blackbody radiation data as output.

The smart doorbell 606 and/or the smart door lock 620 may detect a person's approach to or departure from a location (e.g., an outer door), control doorbell/door locking functionality (e.g., receive user inputs from a portable electronic device 666-1 to actuate the bolt of the smart door lock 620), announce a person's approach or departure via audio or visual means, and/or control settings on a security system (e.g., to activate or deactivate the security system when occupants go and come). In some implementations, the smart doorbell 606 includes some or all of the components and features of the camera 618-1. In some implementations, the smart doorbell 606 includes a camera 618-1, and, therefore, is also called "doorbell camera 606" in this document. Cameras 618-1 and/or 618-2 may function as a streaming video camera and the streaming audio device detailed in relation to various embodiments herein. Cameras 618 may be mounted in a location, such as indoors and to a wall or can be moveable and placed on a surface, such as illustrated with camera 618-2. Various embodiments of cameras 618 may be installed indoors or outdoors.

The smart alarm system 622 may detect the presence of an individual within close proximity (e.g., using built-in IR sensors), sound an alarm (e.g., through a built-in speaker, or by sending commands to one or more external speakers), and send notifications to entities or users within/outside of the smart home environment 600. In some implementations, the smart alarm system 622 also includes one or more input devices or sensors (e.g., keypad, biometric scanner, NFC transceiver, microphone) for verifying the identity of a user, and one or more output devices (e.g., display, speaker). In some implementations, the smart alarm system 622 may also be set to an armed mode, such that detection of a trigger condition or event causes the alarm to be sounded unless a disarming action is performed. In embodiments detailed herein, an alarm system may be linked with a service provider other than a provider of cameras 618. As such, remote services provided by the alarm system may be provided by an entity that does not provide the video and/or audio storage and analysis.

In some implementations, the smart home environment 600 includes one or more intelligent, multi-sensing, network-connected wall switches 608 (hereinafter referred to as "smart wall switches 608"), along with one or more intelligent, multi-sensing, network-connected wall plug interfaces 610 (hereinafter referred to as "smart wall plugs 610"). The smart wall switches 608 may detect ambient lighting conditions, detect room-occupancy states, and control a power and/or dim state of one or more lights. In some instances, smart wall switches 608 may also control a power state or speed of a fan, such as a ceiling fan. The smart wall plugs 610 may detect occupancy of a room or enclosure and control the supply of power to one or more wall plugs (e.g., such that power is not supplied to the plug if nobody is at home).

In some implementations, the smart home environment 600 of FIG. 6 includes a plurality of intelligent, multi-sensing, network-connected appliances 612 (hereinafter referred to as "smart appliances 612"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 640, such as old conventional washer/dryers, refrigerators, and the like, which may be controlled by smart wall plugs 610. The smart home environment 600 may further include a variety of partially communicating legacy appliances 642, such as infrared ("IR") controlled wall air conditioners or other IR-controlled devices, which may be controlled by IR signals provided by the smart hazard detectors 604 or the smart wall switches 608.

In some implementations, the smart home environment 600 includes one or more network-connected cameras 618 that are configured to provide video monitoring and security in the smart home environment 600. The cameras 618 may be used to determine occupancy of the structure 650 and/or particular rooms 652 in the structure 650, and thus may act as occupancy sensors. For example, video captured by the cameras 618 may be processed to identify the presence of an occupant in the structure 650 (e.g., in a particular room 652). Specific individuals may be identified based, for example, on their appearance (e.g., height, face) and/or movement (e.g., their walk/gait). Cameras 618 may additionally include one or more sensors (e.g., IR sensors, motion detectors), input devices (e.g., microphone for capturing audio), and output devices (e.g., speaker for outputting audio). In some implementations, the cameras 618 are each configured to operate in a day mode and in a low-light mode (e.g., a night mode). In some implementations, the cameras 618 each include one or more IR illuminators for providing illumination while the camera is operating in the low-light mode. In some implementations, the cameras 618 include one or more outdoor cameras. In some implementations, the outdoor cameras include additional features and/or components such as weatherproofing and/or solar ray compensation.

The smart home environment 600 may additionally or alternatively include one or more other occupancy sensors (e.g., the smart doorbell 606, smart door locks 620, touch screens, IR sensors, microphones, ambient light sensors, motion detectors, smart nightlights 670, etc.). In some implementations, the smart home environment 600 includes radio-frequency identification (RFID) readers (e.g., in each room 652 or a portion thereof) that determine occupancy based on RFID tags located on or embedded in occupants. For example, RFID readers may be integrated into the smart hazard detectors 604.

The smart home environment 600 may also include communication with devices outside of the physical home but within a proximate geographical range of the home. For example, the smart home environment 600 may include a pool heater monitor 614 that communicates a current pool temperature to other devices within the smart home environment 600 and/or receives commands for controlling the pool temperature. Similarly, the smart home environment 600 may include an irrigation system monitor 616 that communicates information regarding irrigation systems within the smart home environment 600 and/or receives control information for controlling such irrigation systems.

Smart home assistant 619 may have one or more microphones that continuously listen to an ambient environment. Smart home assistant 619 may be able to respond to verbal queries posed by a user, possibly preceded by a triggering phrase. Smart home assistant 619 may stream audio and, possibly, video if a camera is integrated as part of the device, to a cloud-based server system 664 (which represents an embodiment of cloud-based host system 200 of FIG. 2). Smart home assistant 619 may be a smart device through which non-auditory discomfort alerts may be output and/or an audio stream from the streaming video camera can be output.

By virtue of network connectivity, one or more of the smart home devices of FIG. 6 may further allow a user to interact with the device even if the user is not proximate to the device. For example, a user may communicate with a device using a computer (e.g., a desktop computer, laptop computer, or tablet) or other portable electronic device 666 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 600 using a network-connected computer or portable electronic device 666. In some examples, some or all of the occupants (e.g., individuals who live in the home) may register their portable electronic device 666 with the smart home environment 600. Such registration may be made at a central server to authenticate the occupant and/or the device as being associated with the home and to give permission to the occupant to use the device to control the smart devices in the home. An occupant may use their registered portable electronic device 666 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering portable electronic devices 666, the smart home environment 600 may make inferences about which individuals live in the home and are therefore occupants and which portable electronic devices 666 are associated with those individuals. As such, the smart home environment may "learn" who is an occupant and permit the portable electronic devices 666 associated with those individuals to control the smart devices of the home.

In some implementations, in addition to containing processing and sensing capabilities, devices 602, 604, 606, 608, 610, 612, 614, 616, 618, 620, and/or 622 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 660) to a network, such as the Internet. Through the Internet, the smart devices may communicate with a cloud-based server system 664 (also called a cloud-based server system, central server system, and/or a cloud-computing system herein), which represents an embodiment of cloud-based host system 200 of FIG. 2. Cloud-based server system 664 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 664 to smart devices (e.g., when available, when purchased, or at routine intervals).

In some implementations, the network interface 660 includes a conventional network device (e.g., a router), and the smart home environment 600 of FIG. 6 includes a hub device 680 that is communicatively coupled to the network(s) 662 directly or via the network interface 660. The hub device 680 is further communicatively coupled to one or more of the above intelligent, multi-sensing, network-connected devices (e.g., smart devices of the smart home environment 600). Each of these smart devices optionally communicates with the hub device 680 using one or more radio communication networks available at least in the smart home environment 600 (e.g., ZigBee, Z-Wave, Insteon, Bluetooth, Wi-Fi and other radio communication networks). In some implementations, the hub device 680 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols—and is configured to streamline adding of new devices and commissioning of the hub device. In some implementations, hub device 680 further includes a local storage device for storing data related to, or output by, smart devices of smart home environment 600. In some implementations, the data includes one or more of: video data output by a camera device, metadata output by a smart device, settings information for a smart device, usage logs for a smart device, and the like.

In some implementations, smart home environment 600 includes a local storage device 690 for storing data related to, or output by, smart devices of smart home environment 600. In some implementations, the data includes one or more of: video data output by a camera device (e.g., cameras 618 or smart doorbell 606), metadata output by a smart device, settings information for a smart device, usage logs for a smart device, and the like. In some implementations, local storage device 690 is communicatively coupled to one or more smart devices via a smart home network. In some implementations, local storage device 690 is selectively coupled to one or more smart devices via a wired and/or wireless communication network. In some implementations, local storage device 690 is used to store video data when external network conditions are poor. For example, local storage device 690 is used when an encoding bitrate of cameras 618 exceeds the available bandwidth of the external network (e.g., network(s) 662). In some implementations, local storage device 690 temporarily stores video data from one or more cameras (e.g., cameras 618) prior to transferring the video data to a server system (e.g., cloud-based server system 664).

Further included and illustrated in the exemplary smart home environment 600 of FIG. 6 are service robots 668, each configured to carry out, in an autonomous manner, any of a variety of household tasks. For some embodiments, the service robots 668 can be respectively configured to perform floor sweeping, floor washing, etc. in a manner similar to that of known commercially available devices such as the Roomba™ and Scooba™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 668 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks. Further, such service robots may have one or more cameras and/or microphones that enable service robots 668 to stream video and/or audio to cloud-based server system 664 (and thus perform the functions of a streaming video camera similar to one of cameras 618).

When serving as a localized air monitor/purifier for an occupant, a particular service robot 668 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 668 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 668, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 668 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 668 can be advised by other smart-home sensors that the temperature and humidity levels are rising in the kitchen, which is nearby the occupant's current dining room location, and responsive to this advisory, the hazard detector service robot 668 will temporarily raise a hazard detection threshold, such as a smoke detection threshold, under an inference that any small increases in ambient smoke levels will most likely be due to cooking activity and not due to a genuinely hazardous condition.

Various related methods may be performed using the smart doorbells of FIGS. 1-5, the smart home devices of FIG. 6, or other forms of sensor device. Method 700 is directed to controlling functionality of the smart doorbell in response to a doorbell activation. As detailed in respect to some embodiments of FIG. 5, bypass unit 512 may continuously provide power to smart doorbell 201 until a button of smart doorbell 201 is actuated. When the button is actuated, in certain situations, smart doorbell 201 may be temporarily disconnected from power and may operate exclusively from a battery on-board smart doorbell 201. While disconnected, bypass unit 512 may cause power to be routed to doorbell chime 506 to allow doorbell chime 506 to be sounded. As detailed in respect to FIG. 7, in certain circumstances, doorbell chime 506 may not be sounded in order to allow smart doorbell 201 to receive power from transformer 510 continuously (and, thus, not require smart doorbell 201 to function for a time exclusively from an on-board battery). By not interrupting the power provided to smart doorbell 201 when the battery is outside of a particular temperature range (and, possibly, at least a threshold level of charge), a continuous stream of video and/or audio may be maintained. As such, it can be understood that the streaming of video and/or audio is prioritized over the sounding of doorbell chime 506.

Figure 7:
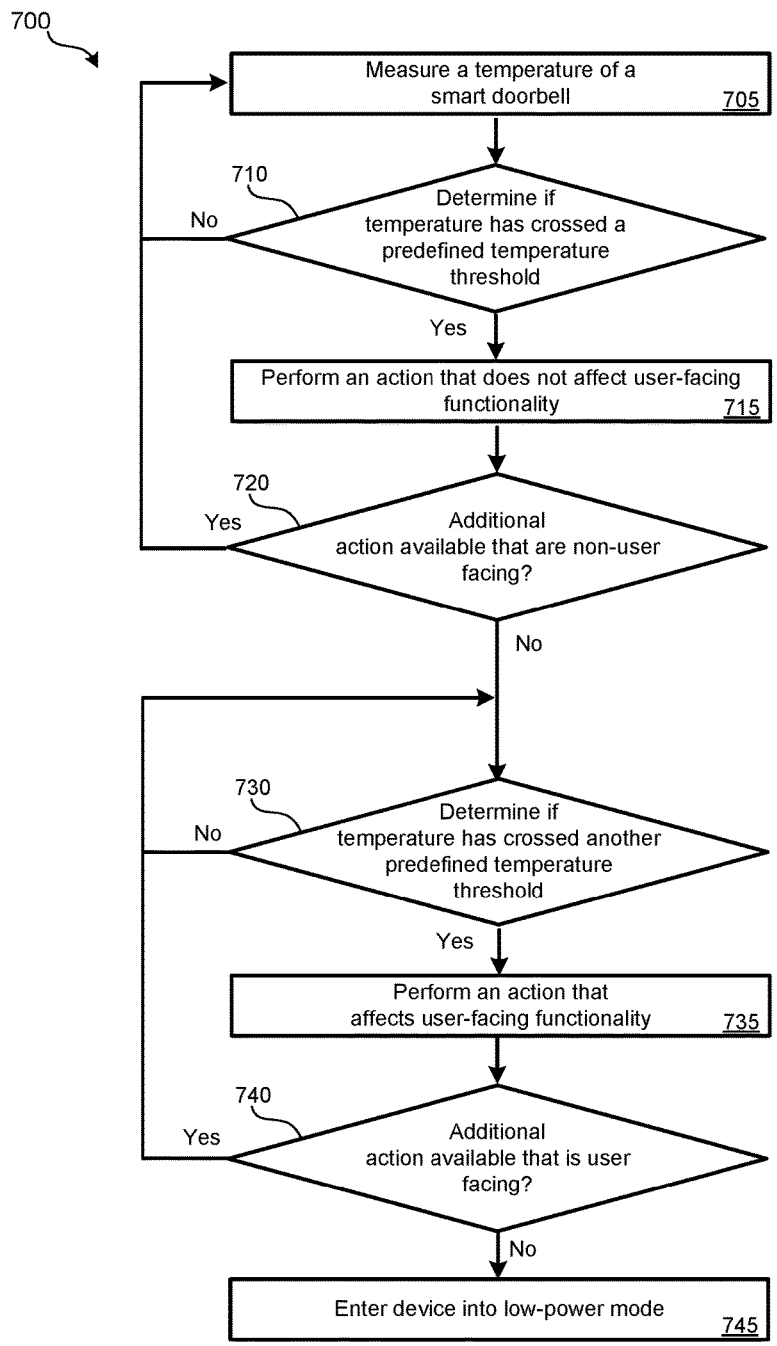
FIG. 7 illustrates an embodiment of a method for controlling operation of a smart doorbell device to help maintain a temperature of one or more batteries of the smart doorbell device within an operating range.

FIG. 7 illustrates an embodiment of a method 700 for controlling operation of a smart doorbell device to help maintain a temperature of one or more batteries of the smart doorbell device (or other smart home device) within an operating range. In various embodiments, methods 800, 1000, and 1100 may be performed independently or as part of method 700. Method 700 may involve first attempting to regulate a temperature of one or more batteries of a smart doorbell by performing actions that do not affect user-facing functionality. If not successful in keeping the one or more batteries of the smart doorbell within a defined temperature operating range, user-facing functionality may be adjusted. Generally, non-user-facing functionality refers to functionality of the smart doorbell that a user cannot detect during normal use. User-facing functionality refers to functionality of the smart doorbell that a user can detect during normal use. Each step of method 700 may be performed by a smart doorbell or some other form of smart home device.

At block 705, a temperature of the smart doorbell may be measured. The temperature may be measured using one or more temperature sensors that are in an internal portion of the smart doorbell. For example, one or more temperature sensors may be located adjacent or in contact to a rechargeable or non-rechargeable battery of the smart doorbell. If multiple temperature sensors are present, the measured temperatures may be averaged or otherwise combined. In some embodiments, the highest or lowest temperature may be used or a temperature from a particular location (e.g., closest to a temperature-sensitive component, such as a battery). The temperature measurements of block 705 may be performed using one or more thermistors. In some embodiments, block 705 is performed periodically.

At block 710, a determination may be made if the measured temperature has crossed a predefined temperature threshold. This predefined temperature threshold may be used to define an upper or lower bound of a temperature operating range of one or more batteries of the smart doorbell device. If the measured temperature has crossed the threshold (e.g., has gone below a low temperature threshold or above a high temperature threshold), method 700 may proceed to block 715. If the measured temperature has not crossed the predefined temperature threshold, method 700 may continue measuring the temperature at block 705 periodically.

At block 715, one or more actions may be performed that do not affect user-facing functionality. These actions may include actions to generate heat when a low temperature threshold has been crossed. For instance, in some embodiments, one or more on-board heaters, such as thermistors, may be activated. A user may be unaware of the thermistor generating heat inside of the smart doorbell. One or more visible-spectrum lights may be activated, even though illumination is not needed. If an on-board display is present, the display may be activated, which could result in heat generation. Additionally or alternatively, some or all of the function of method 1000 may be performed as part of block 715. For instance, a power level of an on-board wireless transceiver may be increased; one or more infrared LEDs may be activated; and/or an on-board speaker may be activated to emit a frequency that cannot be heard within the human hearing range. Each of these features may not affect usability from a user's standpoint and are therefore considered to not be user-facing features. Further detail regarding each of these features is provided in relation to method 1000 in FIG. 10.

In some embodiments, the actions performed at block 715 may include actions or changes to functionality to decrease an amount of heat (either being generated or present) when a high temperature threshold has been crossed. For instance, a fan may be activated to cool internal components of the smart doorbell device. As another example, power of a wireless transceiver may be decreased such that less heat is generated. These features may be considered non-user facing since activation of the fan would not affect usability and the user would not be able to observe the power drop (as long as the quality of transmitted video and/or audio was unaffected). Additional possible actions could involve power or charging cycling (e.g., the device only charging the battery once a defined low voltage threshold is crossed, rather than continuously).

As the temperature is continued to be measured, the temperature may be evaluated against additional temperature thresholds. At block 720, it may be determined whether additional non-user facing features are available to help increase (or decrease) the temperature of the one or more batteries of the smart doorbell. If so, method 700 may return to block 705 (which continues to periodically measure the temperature), the temperature may be evaluated against one or more additional thresholds (e.g., as detailed in FIG. 10) and one or more additional non-user facing actions may be performed. Once all of the non-user facing actions to control temperature have been performed but additional actions are needed to regulate the temperature of the smart doorbell and/or its one or more batteries, method 700 may proceed to block 730.

At block 730, a determination may be made if the measured temperature has crossed another predefined temperature threshold. This predefined temperature threshold may be higher (for decreasing or limiting the increase of the temperature of the smart doorbell) or lower (for increasing the temperature) than the one or more thresholds of block 710. This predefined temperature threshold may be used to define an additional upper or lower bound of a temperature operating range of one or more batteries of the smart doorbell device. If the measured temperature has crossed this additional threshold (e.g., has gone below a low temperature threshold or above a high temperature threshold), method 700 may proceed to block 735. If the measured temperature has not crossed the predefined temperature threshold, method 700 may continue measuring the temperature (such as at block 705) and periodically reevaluate block 730.

At block 740, one or more actions may be performed that do affect user-facing functionality. That is, once all of the non-user-facing actions have been performed to increase or decrease the temperature, if additional temperature control is needed, one or more user-facing actions may be performed. These actions may include actions to generate heat when a low temperature threshold has been crossed. For instance, some or all of method 800 may be performed, which causes a chime electrically connected with the smart doorbell to not be sounded when a doorbell button or other doorbell component is actuated, but still allows for a wireless notification and streaming video and/or audio to be transmitted.

In some embodiments, the actions performed at block 735 may include actions to decrease an amount of heat (either being generated or present) when an additional high temperature threshold has been crossed. For instance, some or all of the blocks of method 1100 of FIG. 11 may be performed. Referring to method 1100, high dynamic range (HDR) video capture may be disabled. Additionally or alternatively, a bitrate of transmitted audio and/or video may be decreased. Additionally or alternatively, infrared LED brightness may be decreased when the infrared LEDs are being used for illumination (e.g., in a low light situation, such as at night). Further detail is provided in relation to method 1100. Method 1100 may be performed in its entirety in place of blocks 730-745.

At block 740, the smart doorbell may determine whether additional user facing features are available to help increase (or decrease) the temperature of the one or more batteries of the smart doorbell. If so, method 700 may return to block

730 (while the temperature is periodically measured), the temperature may be evaluated against one or more additional thresholds (e.g., as detailed in FIG. 11) and one or more additional user facing actions may be performed. Once all of the user facing actions to control temperature have been performed but the temperature continues to increase or decrease, block 745 may be performed.

At block 745, in response to a negative determination of block 740, a low power mode may be enabled. This low power mode may significantly reduce functionality of the smart doorbell. For instance, the smart doorbell may not perform any notification, wireless communication, video capture or record, audio capture or recording, or doorbell chime functions. Rather, the smart doorbell may periodically check an internal temperature or battery temperature to determine if the temperature has dropped below a high temperature threshold or risen above a low temperature threshold. Other functionality of the smart doorbell may be suspended to reduce the likelihood of damage to components and/or self-heating. When a smart doorbell first performs block 745, a notification may be transmitted to a remote device or server that indicates the low-power mode is being entered and, possibly, the reason for entering the low power mode (e.g., temperature too high or too low).

Figure 8:
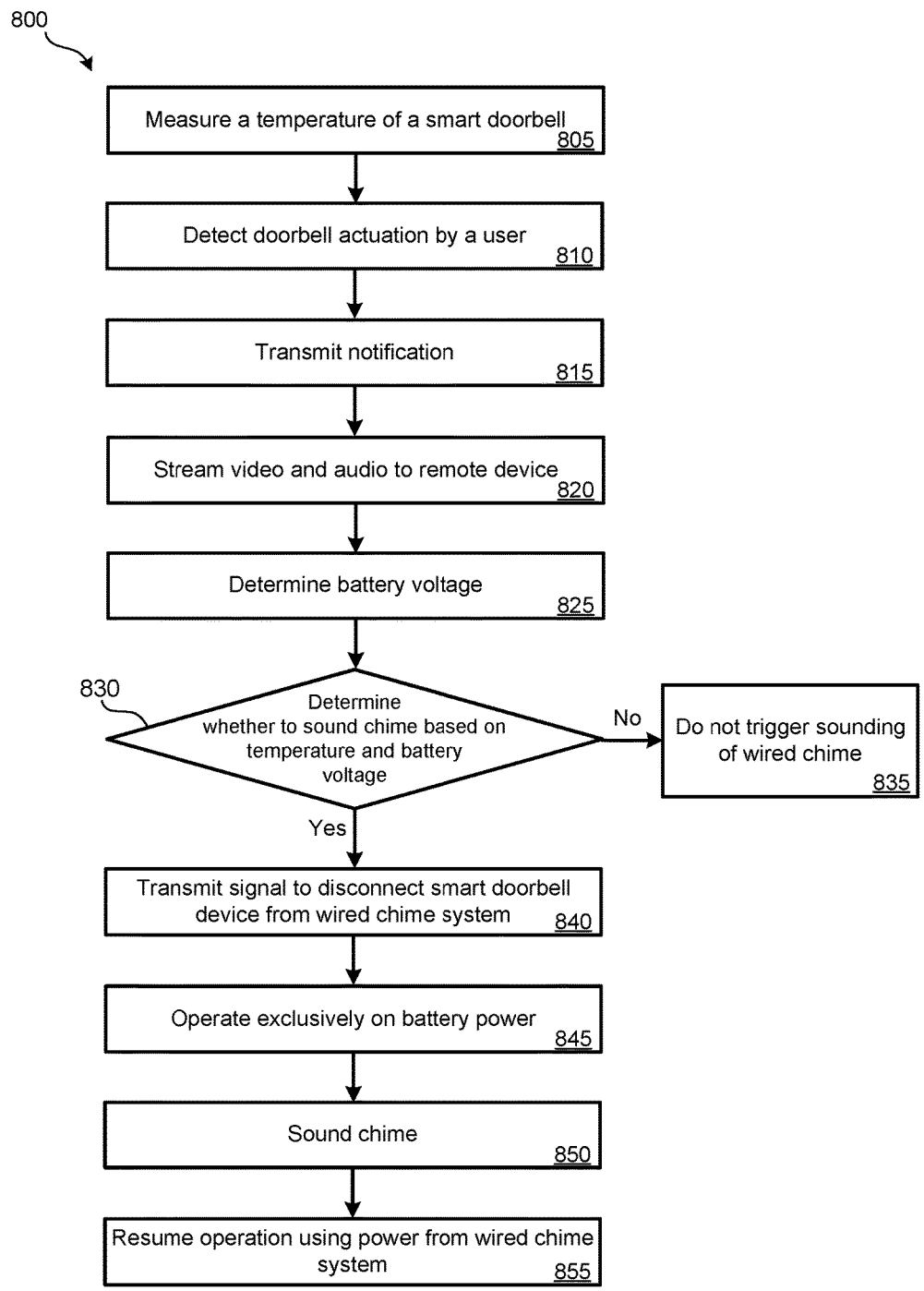
FIG. 8 illustrates an embodiment of a method for controlling operation of a smart doorbell device that is functioning as part of a wired doorbell chime system.

FIG. 8 illustrates an embodiment of a method 800 for controlling operation of a smart doorbell device that is functioning as part of a wired doorbell chime system. Method 800 may be performed as part of block 705 of FIG. 7. That is, not sounding the chime in response to a doorbell press may be understood as the disablement of a user-facing function. In some embodiments, such an action may be taken when the measured temperature of the smart doorbell is below a particular threshold. The smart doorbell may be represented by smart doorbell 201 in FIG. 5. Each block of method 800 may be performed by a smart doorbell system, which can include a smart doorbell, such as smart doorbell 90 or 201.

At block 805, a temperature of the smart doorbell may be measured. The temperature may be measured using one or more temperature sensors that are in an internal portion of the smart doorbell. For example, one or more temperature sensors may be located adjacent or in contact to a rechargeable or non-rechargeable battery of the smart doorbell. If multiple temperature sensors are present, the measured temperatures may be averaged or otherwise combined. In some embodiments, the highest or lowest temperature may be used or a temperature from a particular location (e.g., closest to a temperature-sensitive component, such as a battery). The temperature measurements of block 805 may be performed using one or more thermistors. In some embodiments, block 805 is performed periodically. In other embodiments, block 805 may be performed in response to an external event, such as doorbell actuation being detected at block 810. In some embodiments, the temperature may have been previously measured, such as at block.

At block 810, doorbell actuation may be detected. Doorbell actuation may be caused by a user pushing or otherwise actuating a button or switch of the smart doorbell. In many embodiments, a button is present on the smart doorbell which a user presses in order to alert one or more persons as to his presence.

The smart doorbell performing method 800 may be configured to prioritize continuous video and audio streaming and wireless notifications over the ringing of a chime. In response to the doorbell actuation of block 810, a wireless notification may be transmitted at block 815. This notification may be transmitted directly to one or more user devices and/or to a remote server. This remote server may, in turn, relay a doorbell ring notification to one or more user devices. For instance, the notification may be transmitted by the server to a mobile device in the possession of the user that is registered with a user account with which the smart doorbell is also registered. At block 820, video and audio may be streamed from the smart doorbell via a wireless transceiver to a remote user device and/or a remote server via a wireless network. Streaming of the video and audio may be continuous, such that doorbell actuation of block 810 does not cause the streaming of video and/or audio to be interrupted. Therefore, video and/or audio may be continuously streamed by the smart doorbell for a time before, during, and after doorbell actuation at block 810.

At block 825, a voltage of the battery of the smart doorbell may be determined. In some embodiments, the determination of the battery voltage may be performed in response to the doorbell actuation being detected at block 810. In other embodiments, the battery voltage may be determined periodically. For instance, in some embodiments, the temperature in the battery voltage may be determined at the same or roughly the same periodic interval.

Figure 9:
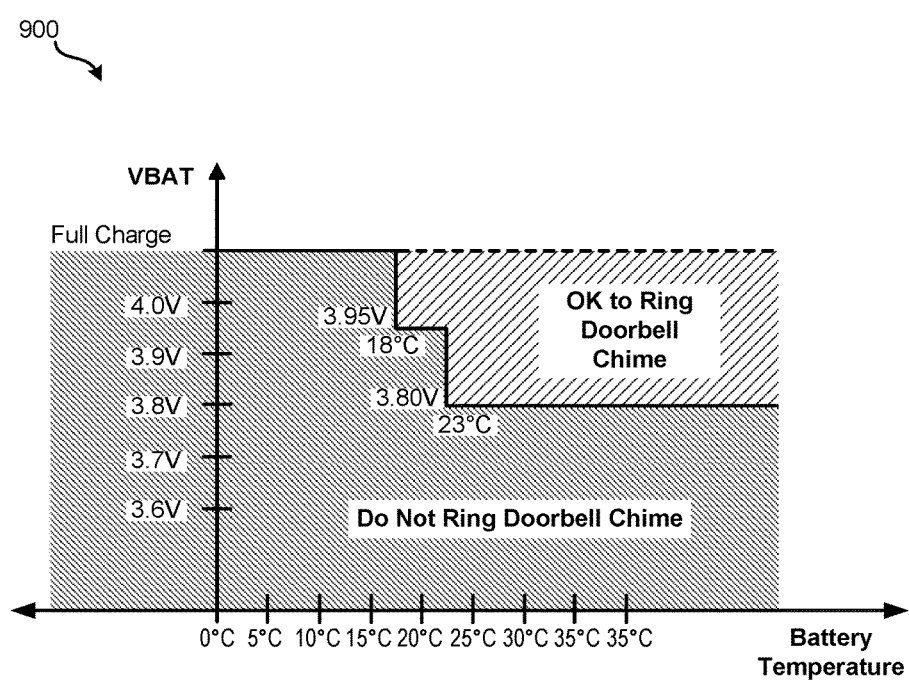
FIG. 9 illustrates an embodiment of a graph that indicates when the doorbell chime may or may not be sounded based on temperature and battery voltage of a smart doorbell.

At block 830, based on the measured temperature of the smart doorbell from block 805 and/or the determined battery voltage of block 825, a determination may be made whether a doorbell chime is to be sounded. Referring to FIG. 9, a graph is presented that indicates an example embodiment of when the doorbell chime may or may not be sounded based on temperature and battery voltage. As shown in FIG. 9, the measured temperature at which the doorbell chime is sounded may be at least partially dependent on a voltage of the smart doorbell's battery. Regardless of whether the doorbell chime is sounded, streaming of video and/or audio may be continuous.

If, at block 830, it is determined that the temperature and battery voltage are not sufficient, such as based on one or more stored temperature thresholds and voltage thresholds, method 800 may proceed to block 835. This negative determination may be indicative of the battery of the smart doorbell being unlikely to provide sufficient power to allow for continuous streaming of video and audio while the smart doorbell is being powered exclusively from the battery of the smart doorbell device. If, at block 830, it is determined that the temperature and battery voltage are sufficient, method 800 may proceed to block 840. This affirmative determination may be indicative of the battery of the smart doorbell having a sufficient charge and being a sufficient temperature to be able to power the continuous streaming of video and/or audio from the battery of the smart doorbell device for at least a period of time while the smart doorbell is disconnected from a wired power supply.

If block 830 is determined in the negative, method 800 may proceed to block 835. The doorbell chime wired with the smart doorbell, such as illustrated in FIG. 5, is not sounded. If block 830 is determined in the positive, method 800 may proceed to block 840. At block 840, the smart doorbell may cause a bypass unit, such as bypass unit 512, to temporarily disconnect the smart doorbell from a wired power supply, such as transformer 510. During this time, video and/or audio streaming may continue, along with other functions of the smart doorbell, with the smart doorbell being powered exclusively by one or more onboard batteries of the smart doorbell at block 845. At block 850, the doorbell chime may be caused to sound. This may involve doorbell chime 506 receiving power from transformer 510 via bypass unit 512. Therefore, the power typically routed by bypass unit 512 to smart doorbell 201 is instead used to power doorbell chime 506 and sound the chime at block 850.

At block 855, operation of the smart doorbell using power from the wired chime system may resume. Therefore, the bypass unit may no longer power the doorbell chime, but may instead route power from a transformer, such as transformer 510, to smart doorbell 201. During this entire process, such as from block 810 through block 855, capture, transmission, and/or recording of video and/or audio may be continuous. Therefore, despite the smart doorbell operating for a period of time exclusively on power stored in an onboard battery, video and/or audio capture and transmission is continuous.

Figure 10:
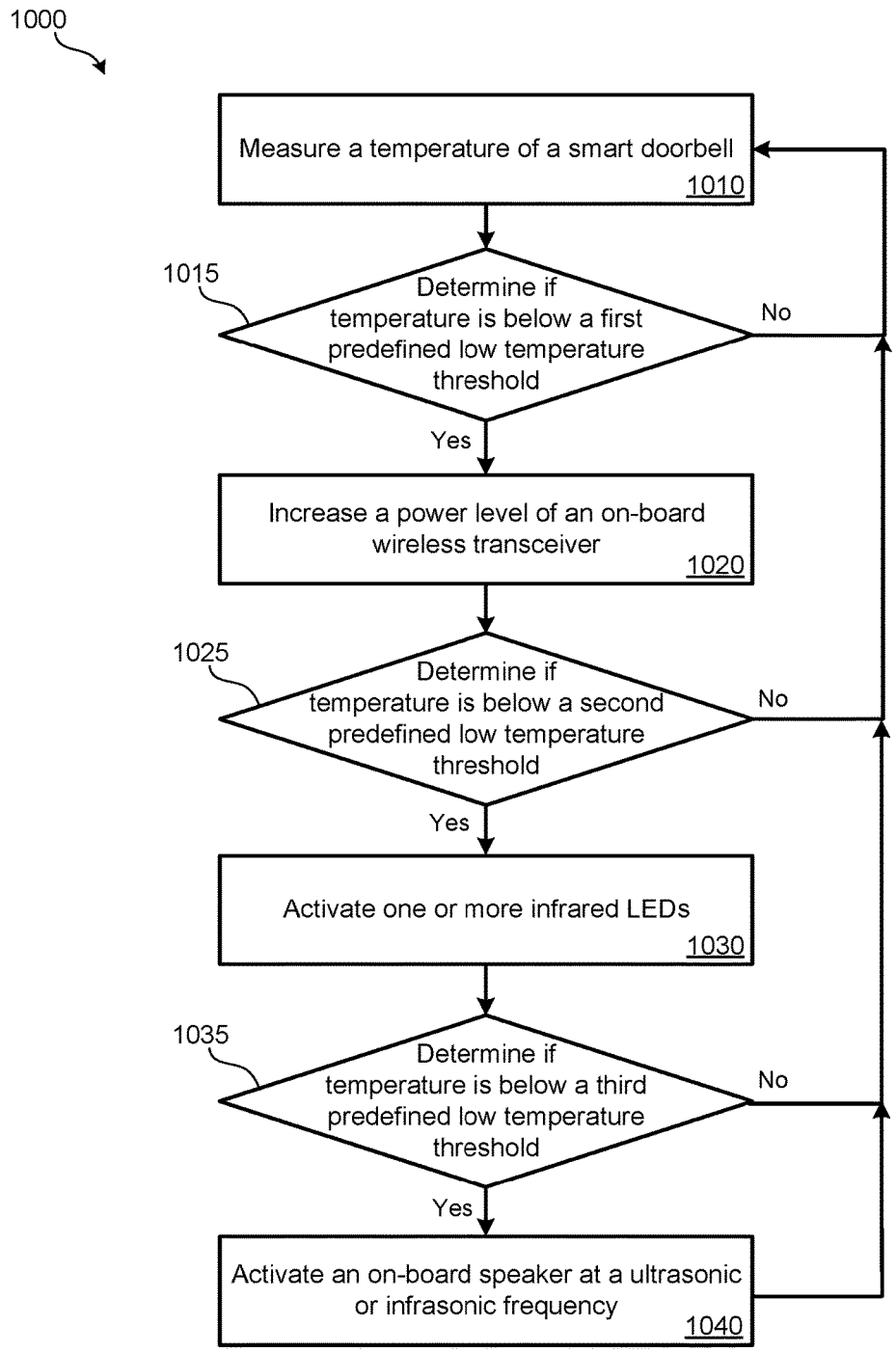
FIG. 10 illustrates an embodiment of a method for controlling a temperature of one or more batteries of a smart doorbell when a low ambient temperature is present.

FIG. 10 illustrates an embodiment of a method 1000 for controlling a temperature of one or more batteries of a smart doorbell when a low ambient temperature is present. Method 1000 may be performed using the smart doorbells of FIGS. 1-5, the smart home devices of FIG. 6, or other forms of sensor device. Method 1000 is focused on performing various functions that do not affect user-facing functionality. That is, from a user's perspective, whether or not the actions of method 1000 are performed cannot directly be observed. Method 1000 may be performed at blocks 1005-715 of method 700 of FIG. 7. In some embodiments, each step of method 1000 may be performed by a smart doorbell. While method 1000 specifically refers to a smart doorbell, it should be understood that other forms of smart home devices or sensor devices may perform similar blocks.

At block 1010, a temperature of the smart doorbell may be measured. The temperature may be measured using one or more temperature sensors that are in an internal portion of the smart doorbell. For example, one or more temperature sensors may be located adjacent or in contact to a rechargeable or non-rechargeable battery of the smart doorbell. If multiple temperature sensors are present, the measured temperatures may be averaged or otherwise combined. In some embodiments, the highest or lowest temperature may be used or a temperature from a particular location (e.g., closest to a temperature-sensitive component, such as a battery). In some embodiments, the temperature of multiple different components may be monitored (either according to a same temperature threshold or different temperature thresholds), such as a processor and image sensor (in addition or in alternate to the battery). Therefore, in some situations or embodiments, a particular component may tend to be colder than others. Therefore, the temperature of this particular component may result in various actions be taken to increase the temperature. The temperature measurements of block 1010 may be performed using one or more thermistors.

At block 1015, a determination may be made by the smart doorbell to determine if the temperature is below a first low temperature threshold. The first low temperature threshold may be indicative of a temperature below which performance of one or more batteries of the smart doorbell tends to work less effectively (e.g., the amount of current output and/or the ability to maintain a voltage level is degraded). For instance, in some embodiments, if the temperature is measured at block 1010 to be below 50° C., method 1000 may proceed to block 1020. In other embodiments, the temperature threshold may be between 30-70° C. If the temperature determined at block 1015 is above (or at) the first low temperature threshold, method 1000 may return to block 1010 to continue monitoring the temperature. If the power level of the on-board wireless transceiver was previously increased for heating purposes, the power level of the wireless transceiver may no longer be increased, unless needed for the purposes of receiving and/or transmitting data. Alternatively, a different temperature threshold may trigger block 1030 to be performed based on a temperature measurement performed near a different device component, such as near an image sensor or processor.

If the temperature determined at block 1015 is below the temperature threshold, method 1000 may proceed to block 1010 to continue monitoring the temperature. At block 1020, the power level (e.g., the transmit power level) of an on-board wireless transceiver may be increased. The power level may be increased to the maximum available power output. It should be understood that the increase in power level may not be needed to effectuate improved communication range or rate; but, rather, the power is being increased to take advantage of the secondary effect of heat generation. By the wireless transceiver operating at a higher power, a greater amount of heat is generated. This heat can help increase the internal temperature of the smart doorbell and, specifically, help warm one or more batteries. In some embodiments, the wireless transceiver is a WiFi transceiver that is instructed to operate in power management (PM) mode 0 at block 1020. For instance, the WiFi transceiver may be switched to PM mode 0 from PM mode 2. PM mode 0 may result in the WiFi transceiver operating in a high or maximum power that is permitted by wireless transceiver.

Method 1000 illustrates block 1020 as being performed in response to block 1015 being determined in the affirmative. In other embodiments, block 1030 or 1040 may be performed in lieu of block 1020 in response to block 1015 being determined in the affirmative. In still other embodiments, multiple blocks of blocks 1020, 1030, and 1040 may be performed in response to block 1015 being determined in the affirmative. For instance, block 1015, when evaluated in the affirmative, may result in each of block 1020, 1030, and 1040 being performed.

At block 1025, a second low temperature threshold that is lower than the first low temperature threshold may be evaluated to determine if one or more additional actions should be taken to increase the temperature of the battery of the smart doorbell. The second low temperature threshold may be indicative of a temperature below which performance of one or more batteries of the smart doorbell tends to be significantly less effective (e.g., the amount of current output and/or the ability to maintain a voltage level is degraded). For instance, in some embodiments, if the temperature is measured at block 1010 to be below 25° C., method 1000 may proceed to block 1030. In other embodiments, the temperature threshold may be between 10-40° C. If the temperature determined at block 1010 was above (or at) the second low temperature threshold, method 1000 may return to block 1010 to continue monitoring the temperature. If block 1025 is determined in the negative, if the infrared LEDs (or other infrared illuminators) were previously activated for heating purposes, they may be disabled.

At block 1030, one or more infrared illuminators, such as IR LEDs may be activated in response to block 1025 being determined in the affirmative. The IR LEDs can be enabled at block 1030 irrespective of the need of IR illumination of the field-of-view of the camera of the smart doorbell. Such activation of the IR LEDs may generate heat as a secondary effect. This heat may help heat internal components of the smart doorbell, such as one or more batteries. For instance, block 1030 may involve the IR LEDs being activated during the day when sufficient visible light is present to illuminate the field of view of the smart doorbell's camera. At night (or otherwise when there is insufficient ambient lighting to illuminate the camera's field of view), the IR LEDs may be enabled regardless of temperature. When heating is not needed, the one or more IR LEDs may be activated based on a measured amount of ambient light or luminosity being below a defined threshold. However, at block 1030, the IR LEDs may be activated despite the measured luminosity being above this defined threshold.

In some embodiments, when block 1030 is performed, the IR LEDs are enabled at maximum output or brightness. By enabling at maximum output or brightness, the current passed through the IR LEDs may be at a maximum and may generate a significant (e.g., maximum) amount of heat. Such enablement at the maximum may only be performed during the day when the IR LEDs are not additionally being used to illuminate the field of view of the smart doorbell's camera. At night (or otherwise when there is insufficient ambient lighting to illuminate the camera's field of view), the output level may be regulated to properly illuminate one or more objects present in the field of view. For instance, at night, maximum output may result in too high of a reflection of IR for the camera to properly image the field of view. As such, the output of the IR LEDs may be regulated. In some embodiments, the output may be regulated below maximum even if the IR LEDs are not being used for low-light illumination. For instance, the output level of the IR LEDs may be a function of temperature (e.g., as the temperature decreases, the output level of the IR LEDs is increased until a maximum output level is reached).

When the IR LEDs are active during the day (or otherwise when sufficient visible light is available for illumination of the field of view of the camera), an IR filter of the doorbell camera may be positioned such that IR light is blocked from entering the sensor of the camera or is otherwise ignored. If the doorbell is pressed while the IR LEDs are active for heating, the IR LEDs may be disabled, such as for a period of 1-5 seconds, to decrease current draw while a chime of the doorbell system is being activated.

Method 1000 illustrates block 1030 as being performed in response to block 1025 being determined in the affirmative. In other embodiments, block 1020 or 1040 may be performed in lieu of block 1020 in response to block 1025 being determined in the affirmative. In still other embodiments, multiple blocks of blocks 1020, 1030, and 1040 may be performed in response to block 1025 being determined in the affirmative. For instance, block 1025, when evaluated in the affirmative, may result in each of blocks 1030 and 1040 (and 1020, if not already performed) being performed.

At block 1035, a third low temperature threshold that is lower than the first and second low temperature thresholds may be evaluated to determine if one or more additional actions should be taken to increase the temperature of the battery of the smart doorbell. The third low temperature threshold may be indicative of a temperature below which performance of one or more batteries of the smart doorbell tends to work much less effectively (e.g., the amount of current output and/or the ability to maintain a voltage level is degraded). For instance, in some embodiments, if the temperature is measured at block 1010 to be below 10° C., method 1000 may proceed to block 1040. In other embodiments, the temperature threshold may be between −10° C.-40° C. If the temperature determined at block 1010 was above (or at) the third low temperature threshold, method 1000 may return to block 1010 to continue monitoring the temperature. If block 1035 is determined in the negative, if the speaker was previously activated to help heat the smart doorbell, such activation may be ceased. Alternatively, a different temperature threshold may trigger block 1040 to be performed based on a temperature measurement performed near a different device component, such as near an image sensor or processor.

At block 1040, an on-board speaker, such as speaker 155, of the smart doorbell may be activated in response to block 1035 being evaluated in the affirmative. At block 1035, a sound may be generated that is outside the hearing range of most or all humans (e.g., outside the 20-20,000 Hz range). Further, the sound generated may be outside of the hearing range of common pets (e.g., dogs and cats). The sound may be infrasonic or ultrasonic. Generation of the sound may result in heat being generated as a byproduct. The heat may help heat internal components of the smart doorbell, such as one or more batteries. The magnitude of the output sound may be at a maximum permitted by the speaker and/or amplifier or may be dynamically adjusted based on available power and/or temperature (e.g., the lower the measured temperature, the greater the output magnitude).

Figure 11:
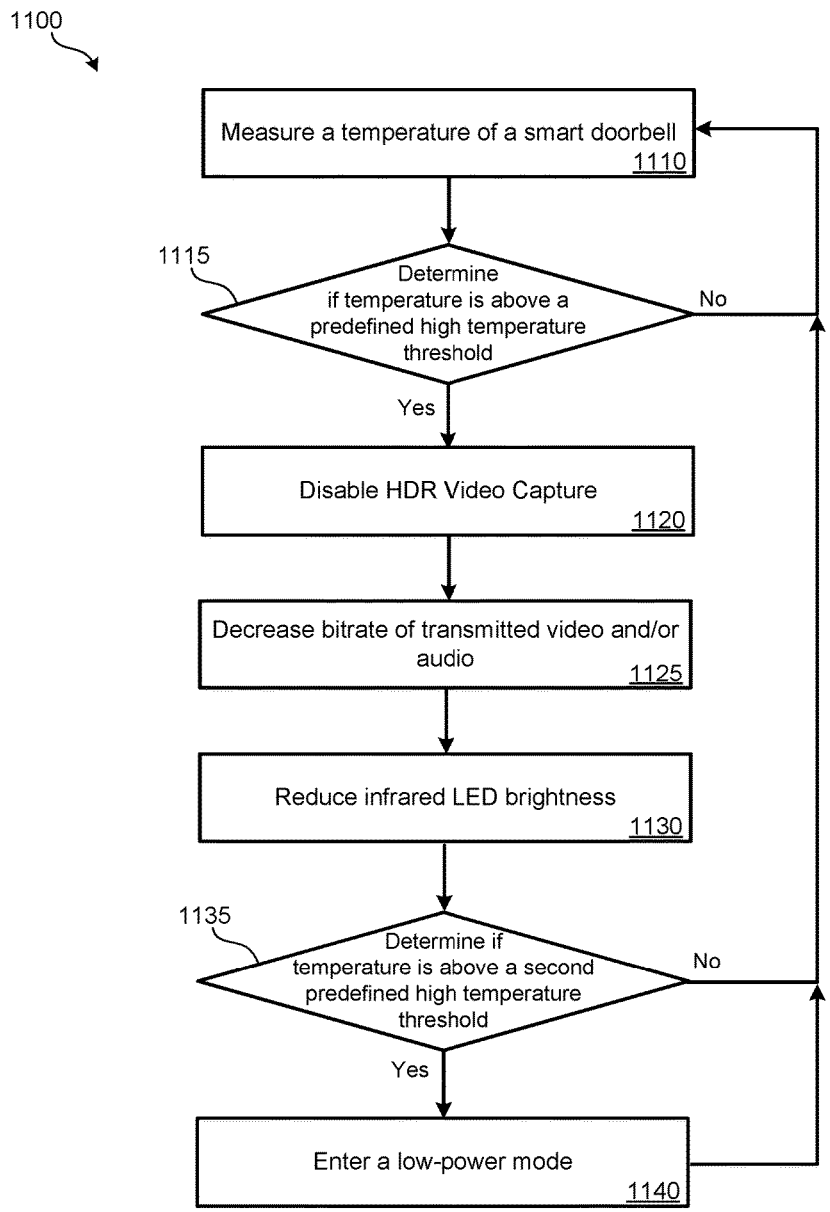
FIG. 11 illustrates an embodiment of a method for controlling a temperature of one or more batteries of a smart doorbell when a high ambient temperature is present.

While method 1000 focuses on how to increase the temperature of internal components of a smart doorbell using secondary characteristics of components, in other situations it may be beneficial to decrease (or at least limit the increase) of the internal temperature of a smart doorbell, such as to remain within an operating range of one or more batteries of the smart doorbell. FIG. 11 illustrates an embodiment of a method 1100 for controlling a temperature of one or more batteries of a smart doorbell when a high ambient temperature is present. Additionally, each of the actions performed as part of method 1100 may be understood as user-facing. That is, a user of the smart doorbell may notice changes in functionality of the smart doorbell as compared to normal operation. Steps of method 1100 may be performed as part of blocks 725-735 of method 700 of FIG. 7. In some embodiments, the temperature of multiple different components may be monitored, such as a processor and image sensor (in addition or in alternate to the battery). Therefore, in some situations or embodiments, a particular component other than the battery may tend to operate hottest. Therefore, the temperature of this particular component may result in various actions be taken to decrease the temperature of the hottest component to preserve functionality and/or decrease the risk of damage.

Method 1100 may be performed using the smart doorbells of FIGS. 1-5, the smart home devices of FIG. 6, or other forms of sensor device. In some embodiments, each step of method 1100 may be performed by a smart doorbell. While method 1100 specifically refers to a smart doorbell, it should be understood that other forms of smart home devices or sensor devices may perform similar blocks.

Various features may be in place of the smart doorbell to help decrease self heating. At least some of such features may be permanently enabled. For example, input and output voltages of the smart doorbell may be modified to operate at a lower voltage, such as 3.1 V rather than 3.3 V. Such an arrangement may decrease the power used and thus heat dissipation of components within the smart doorbell. In some embodiments, one or more clocks of the smart doorbell may be decreased in frequency. The clock speeds used may remain sufficient to support desired operational characteristics, such as a recorded video resolution. However, the decrease in frequency may result in a decreased power consumption of the device, such as a half watt less in power usage. In some embodiments, clock speed for a digital signal processing clock may be reduced from 336 MHz to 216 MHz. Another clock may be reduced from 312 MHz to 216 MHz.

At block 1110, a temperature of the smart doorbell may be measured. The temperature may be measured using one or more temperature sensors that are in an internal portion of the smart doorbell. For example, one or more temperature sensors may be located adjacent or in contact to a rechargeable or non-rechargeable battery of the smart doorbell. If multiple temperature sensors are present, the measured temperatures may be averaged or otherwise combined. In some embodiments, the highest or lowest temperature may be used or a temperature from a particular location (e.g., closest to a temperature-sensitive component, such as a battery). The temperature measurements of block 1110 may be performed using one or more thermistors.

At block 1115, a determination may be made by the smart doorbell to determine if the temperature is above a high temperature threshold. The high temperature threshold may be indicative of a temperature above which performance of one or more batteries of the smart doorbell tends to work less effectively (e.g., the amount of current output and/or the ability to maintain a voltage level is degraded) and/or damage may result to the one or more batteries. For instance, in some embodiments, if the temperature is measured at block 1110 to be above a threshold within 70° C.-85° C., method 1100 may proceed to block 1120. If the temperature determined at block 1115 is below (or at) the high temperature threshold, method 1100 may return to block 1110 to continue monitoring the temperature. Alternatively, a different temperature threshold may trigger one or more of blocks 1120-through 1130 to be performed based on a temperature measurement performed near a different device component, such as near an image sensor or processor.

Block 1120 may be performed if block 1115 is determined in the affirmative. At block 1120, high dynamic range (HDR) imaging may be disabled. HDR imaging may allow for a greater dynamic range of luminosity to be captured as opposed to using standard image capture techniques using the onboard camera of the smart doorbell. Therefore, when HDR imaging is active, an output stream of video to a server or end-user device may result in higher quality video being recorded and/or presented to the user. With HDR imaging disabled, the video quality may be lower; however, less heat may be generated by the smart doorbell, such as due to less processing being performed by the one or more processors of the smart doorbell.

Block 1125 may additionally or alternatively be performed if block 1115 is determined in the affirmative. In other embodiments, block 1125 may be performed if a second, higher temperature threshold is determined to have been met by the measured temperature of block 1110. At block 1125, the bit rate used for capturing video and/or transmitting video by the smart doorbell device may be decreased. By the bit rate being decreased, the amount of processing and the amount of data transmission may be decreased. Such an arrangement may decrease the amount of heat generated internally to the smart doorbell device. As such, the amount of self heating within the smart doorbell may be decreased.

Block 1130 may additionally or alternatively be performed if block 1115 is determined in the affirmative. In other embodiments, block 1125 may be performed if a second (or third), higher temperature threshold is determined to have been met by the measured temperature of block 1110. If different high temperature thresholds are used to determine whether blocks 1120, 1125, and 1130 are to be performed, the order of these blocks may be adjusted. For example, in some embodiments, the bit rate of the transmitted video and/or audio may be decreased at a lower temperature than when HDR video capture is disabled. At block 1130, the brightness of infrared LEDs or some other form of infrared illuminators may be decreased. Such infrared LEDs may be disabled when ambient visible light lighting is sufficient such that infrared illumination is not necessary. Such a scenario may typically be present during the day. At night, however, when ambient lighting is significantly lower, infrared LEDs may be used to illuminate the field of view of the camera of the smart doorbell. Decreasing the brightness of the infrared LEDs may decrease power usage and, therefore, decrease byproduct heat being created within the smart doorbell. This arrangement, however, may result in one or more objects within the field of view of the camera being illuminated at a less than optimal brightness. Therefore, image quality may be at least slightly degraded.

At block 1135, a determination may be made by the smart doorbell to determine if the temperature is above a second high temperature threshold. The second high temperature threshold may be higher than the first high temperature threshold. While the smart doorbell device may continue functioning, possibly with a reduced feature set, when the measured temperature is higher than the first high temperature threshold, functionality of the smart doorbell may be greatly decreased if the second high temperature threshold is met or exceeded. The second high temperature threshold may be indicative of a temperature above which performance of one or more batteries of the smart doorbell tends to be ineffective (e.g., the amount of current output and/or the ability to maintain a voltage level is degraded) and/or damage may result to the one or more batteries. For instance, in some embodiments, if the temperature is measured at block 1110 to be above a second high temperature threshold above 85° C., such as 93° C., method 1100 may proceed to block 1140. In some embodiments, at least a number of consecutive measurements above the second high temperature threshold may be required before proceeding to block 1140 (e.g., 2, 3, 4, or 5 or more). If the temperature determined at block 1115 is below the second high temperature threshold, method 1100 may return to block 1110 to continue monitoring the temperature. In some embodiments, if multiple temperature sensors are present within the smart doorbell, different high temperature thresholds may be used to determine when block 1140 should be performed based on different temperature sensors. For example, a first high-temperature threshold may be set for a temperature sensor located near the one or more batteries of the smart doorbell, while a different second high temperature threshold may be set for a temperature sensor located on a main circuit board of the smart doorbell. Similar arrangements may be present for the other high and low temperature thresholds discussed in this document.

At block 1140, in response to an affirmative determination of block 1135, a low power mode may be enabled. This low power mode may significantly reduce functionality of the smart doorbell. For instance, the smart doorbell may not perform any notification, wireless communication, video capture or record, audio capture or recording, or doorbell chime functions. Rather, the smart doorbell may periodically check an internal temperature or battery temperature to determine if the temperature has dropped below the high temperature threshold of block 1135. Other functionality of the smart doorbell may be suspended to reduce the likelihood of damage to components and/or self-heating. When a smart doorbell first performs block 1140, a final notification may be transmitted to a remote device or server that indicates the low-power mode is being entered and, possibly, the reason for entering the low power mode (e.g., temperature too high).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for operating a smart doorbell device, the method comprising:
    measuring, using a temperature sensor of the smart doorbell device, a first measured temperature;
    determining, by the smart doorbell device, that the first measured temperature has crossed a first predefined temperature threshold;
    in response to determining that the first measured temperature has crossed the first predefined temperature threshold, altering operation of a component of the smart doorbell device such that user-facing functionality of the smart doorbell device is unchanged, wherein:
        altering the operation of the component of the smart doorbell device causes the component to generate more heat or less heat;
    measuring, using the temperature sensor of the smart doorbell device, a second measured temperature;
    determining, by the smart doorbell device, that the second measured temperature has crossed a second predefined temperature threshold; and
    in response to determining that the second measured temperature has crossed the second predefined temperature threshold, altering operation of the smart doorbell device such that a chime that is electrically coupled to the smart doorbell device is not sounded in response to actuation of a doorbell, but that a notification of the actuation of the doorbell is wirelessly transmitted by the smart doorbell device.

2. The method for operating the smart doorbell device of claim 1, wherein altering operation of the component of the smart doorbell device such that user-facing functionality of the smart doorbell device is unchanged comprises increasing a power level of a wireless transceiver that is located on-board the smart doorbell device.

3. The method for operating the smart doorbell device of claim 1, wherein altering operation of the component of the smart doorbell device such that user-facing functionality of the smart doorbell device is unchanged comprises activating one or more infrared light emitting diodes (IR LEDs) that illuminate a field-of-view of a camera of the smart doorbell device.

4. The method for operating the smart doorbell device of claim 1, wherein altering operation of the component of the smart doorbell device such that user-facing functionality of the smart doorbell device is unchanged comprises activating a speaker of the smart doorbell device at a frequency outside of a human hearing range to generate heat.

5. The method for operating the smart doorbell device of claim 1, further comprising:
    measuring a voltage of one or more batteries of the smart doorbell device; and
    determining, by the smart doorbell device, the second predefined temperature threshold based at least in part on the measured voltage.

6. The method for operating the smart doorbell device of claim 1, further comprising:
    transmitting, by the smart doorbell device via a wireless transceiver, a video stream.

7. The method for operating the smart doorbell device of claim 6, wherein the notification is linked to a video clip of the video stream transmitted by the smart doorbell device.

8. The method for operating the smart doorbell device of claim 6, wherein the video stream is continuous and the video stream is not interrupted by the doorbell of the smart doorbell device being actuated.

9. The method for operating the smart doorbell device of claim 1, further comprising:
    measuring, using the temperature sensor of the smart doorbell device, a third measured temperature;
    determining, by the smart doorbell device, that the third measured temperature has crossed a third predefined temperature threshold, wherein:
        the third predefined temperature threshold is between the first predefined temperature threshold and the second predefined temperature threshold; and
    in response to determining that the third measured temperature has crossed the third predefined temperature threshold, altering operation of a second component of the smart doorbell device such that user-facing functionality of the smart doorbell device is unchanged, wherein altering the operation of the second component of the smart doorbell device causes the component to generate more heat or less heat.

10. The method for maintaining functionality of the smart doorbell device of claim 1, further comprising detecting, by the smart doorbell device, that the doorbell of the smart doorbell device has been actuated.

11. A smart doorbell device comprising:
a housing;
a doorbell interface, attached with the housing, that is configured to be actuated by a user;
a battery module located within the housing;
one or more temperature sensors located within the housing;
a wireless interface located within the housing;
chime activation circuitry located within the housing;
one or more processors located within the housing that receives data from the one or more temperature sensors and the doorbell interface, communicates with the wireless interface, and controls the chime activation circuitry, wherein the one or more processors are configured to:
receive measured temperatures from the one or more temperature sensors;
determine that a first measured temperature received from the one or more temperature sensors has crossed a first predefined temperature threshold;
in response to determining that the first measured temperature has crossed the first predefined temperature threshold, alter operation of a component of the smart doorbell device such that user-facing functionality of the smart doorbell device is unchanged, wherein:
altering the operation of the component of the smart doorbell device causes the component to generate more heat or less heat;
determine that a second measured temperature has crossed a second predefined temperature threshold; and
in response to determining that the second measured temperature has crossed the second predefined temperature threshold, alter operation of the smart doorbell device such that a chime that is electrically coupled to the smart doorbell device is not sounded in response to actuation of the doorbell interface, but that a notification of the actuation of the doorbell interface is wirelessly transmitted by the wireless interface.

12. The smart doorbell device of claim 11, wherein the one or more processors being configured to alter operation of the component of the smart doorbell device such that user-facing functionality of the smart doorbell device is unchanged comprises the one or more processors being configured to cause a power level of the wireless interface to be increased.

13. The smart doorbell device of claim 11, wherein the one or more processors being configured to alter operation of the component of the smart doorbell device such that user-facing functionality of the smart doorbell device is unchanged comprises the one or more processors being configured to activate one or more infrared light emitting diodes (IR LEDs) that illuminate a field-of-view of a camera of the smart doorbell device.

14. The smart doorbell device of claim 11, wherein the one or more processors being configured to alter operation of the component of the smart doorbell device such that user-facing functionality of the smart doorbell device is unchanged comprises the one or more processors being configured to activate a speaker of the smart doorbell device at a frequency outside of a human hearing range to generate heat.

15. The smart doorbell device of claim 11, wherein the one or more processors is further configured to determine the second predefined temperature threshold based at least in part on a measured voltage of the battery module.

16. The smart doorbell device of claim 11, further comprising a camera, attached with the housing, that captures video, wherein the wireless interface transmits a video stream captured by the camera.

17. The smart doorbell device of claim 16, wherein the notification generated by the one or more processors is linked to a video clip of the video stream transmitted by the wireless interface.

18. The smart doorbell device of claim 16, wherein the video stream is continuous and the video stream is not interrupted by the doorbell interface being actuated.

19. The smart doorbell device of claim 11, wherein the one or more processors are further configured to:
determine that a third measured temperature has crossed a third predefined temperature threshold, wherein:
the third predefined temperature threshold is between the first predefined temperature threshold and the second predefined temperature threshold; and
in response to determining that the third measured temperature has crossed the third predefined temperature threshold, alter operation of a second component of the smart doorbell device such that user-facing functionality of the smart doorbell device is unchanged, wherein altering the operation of the second component of the smart doorbell device causes the component to generate more heat or less heat.

20. The smart doorbell device of claim 19, wherein altering the operation of the component comprises causing a power level of the wireless interface to be increased and altering the operation of the second component comprises activating one or more infrared light emitting diodes (IR LEDs) that illuminate a field-of-view of a camera of the smart doorbell device.

* * * * *